(12) United States Patent
Suzuki et al.

(10) Patent No.: US 11,124,180 B2
(45) Date of Patent: Sep. 21, 2021

(54) PARKING CONTROL METHOD AND PARKING CONTROL DEVICE

(71) Applicants: Nissan Motor Co., Ltd., Yokohama (JP); Renault S.A.S., Boulogne-Billancourt (FR)

(72) Inventors: Yasuhiro Suzuki, Kanagawa (JP); Yasuhisa Hayakawa, Kanagawa (JP); Yohei Taniguchi, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/339,200

(22) PCT Filed: Oct. 4, 2016

(86) PCT No.: PCT/JP2016/079502
§ 371 (c)(1),
(2) Date: Apr. 3, 2019

(87) PCT Pub. No.: WO2018/066069
PCT Pub. Date: Apr. 12, 2018

(65) Prior Publication Data
US 2019/0232953 A1    Aug. 1, 2019

(51) Int. Cl.
*B60W 30/06*    (2006.01)
*G08G 1/16*    (2006.01)
*B62D 15/02*    (2006.01)
*G01C 21/20*    (2006.01)

(52) U.S. Cl.
CPC .......... *B60W 30/06* (2013.01); *B62D 15/027* (2013.01); *B62D 15/0285* (2013.01); *G01C 21/20* (2013.01); *G08G 1/168* (2013.01); *B60W 2520/10* (2013.01); *B60W 2520/105* (2013.01); *B60W 2556/45* (2020.02)

(58) Field of Classification Search
CPC . B60W 30/06; B62D 15/027; B62D 15/0285; G01C 21/20; G08G 1/168; G08G 1/165
USPC ....................................... 701/23, 2
See application file for complete search history.

(56) References Cited

U.S. PATENT DOCUMENTS

2012/0158237 A1   6/2012  Lee et al.
2014/0365032 A1   12/2014 Park et al.
2015/0367845 A1*  12/2015 Sannodo ............... B60W 30/06
                                              701/23

(Continued)

FOREIGN PATENT DOCUMENTS

DE    102011051313 A1    12/2012
DE    102012200625 A1 *  7/2013  ............. E04H 6/422

(Continued)

*Primary Examiner* — Isaac G Smith
(74) *Attorney, Agent, or Firm* — Young Basile Hanlon & MacFarlane, P.C.

(57) ABSTRACT

A parking control apparatus includes an input device configured to acquire an operation command acquired from inside or outside of a vehicle and a control device configured to control the vehicle in accordance with the operation command. The control device is configured to determine a communication environment around the vehicle and control the vehicle to park in accordance with a result of the determination.

20 Claims, 18 Drawing Sheets

(56) References Cited

U.S. PATENT DOCUMENTS

| | | | |
|---|---|---|---|
| 2015/0375740 A1* | 12/2015 | Okamura | B60W 30/06 |
| | | | 701/25 |
| 2015/0375741 A1 | 12/2015 | Kiriya | |
| 2016/0148450 A1 | 5/2016 | Ohshima | |
| 2017/0032680 A1* | 2/2017 | Imai | B62D 15/028 |
| 2017/0086112 A1* | 3/2017 | Xue | H04W 36/06 |
| 2017/0088130 A1* | 3/2017 | Suzuki | B60R 11/04 |
| 2017/0168479 A1 | 6/2017 | Dang Van Nhan | |
| 2017/0208632 A1* | 7/2017 | Gunasekara | H04L 12/14 |
| 2018/0144566 A1 | 5/2018 | Ohshima | |

FOREIGN PATENT DOCUMENTS

| | | |
|---|---|---|
| DE | 102012002208 A1 | 8/2013 |
| DE | 102012022087 A1 | 5/2014 |
| JP | 2008174192 A | 7/2008 |
| JP | 2015054530 A | 3/2015 |
| JP | 2016007959 A | 1/2016 |
| JP | 2016097927 A | 5/2016 |
| KR | 20120069510 A | 6/2012 |
| WO | 2015114269 A1 | 8/2015 |

\* cited by examiner

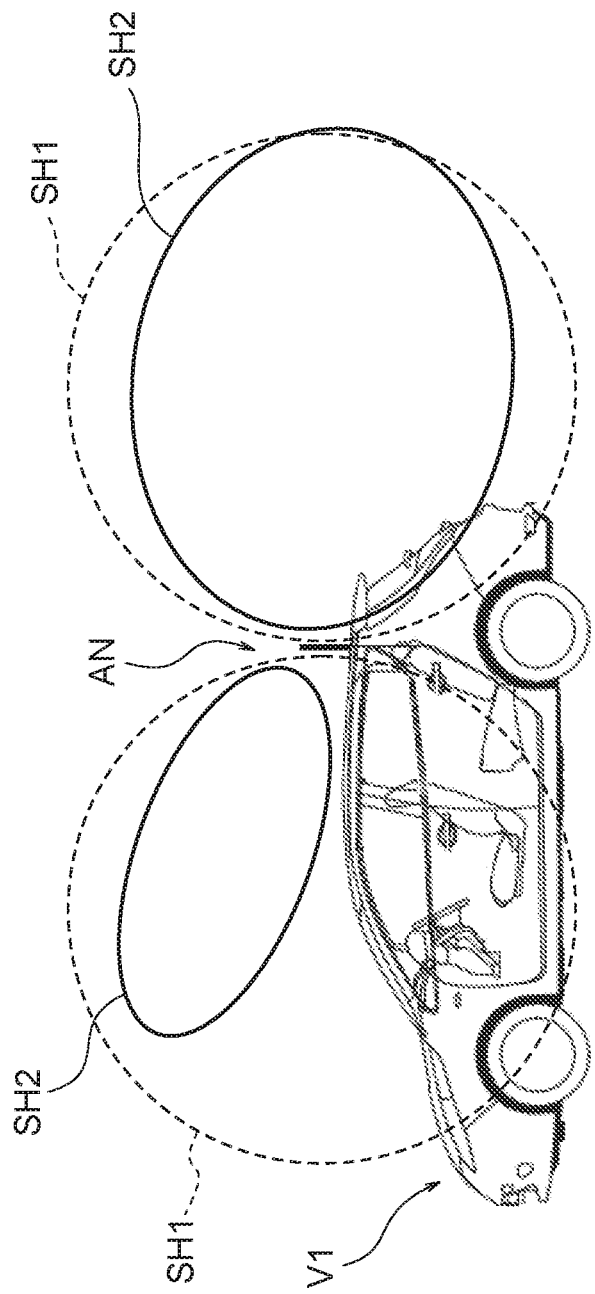

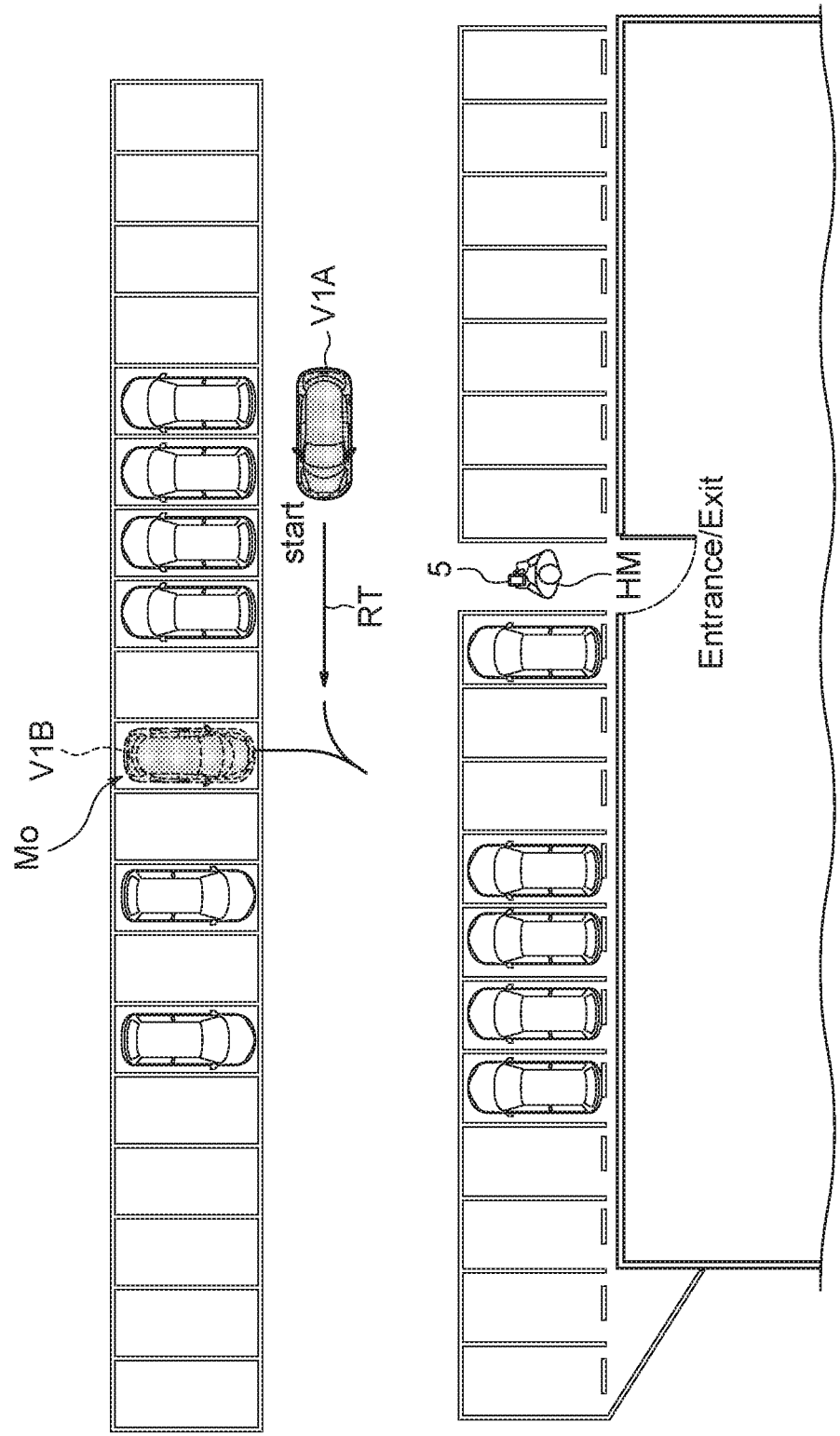

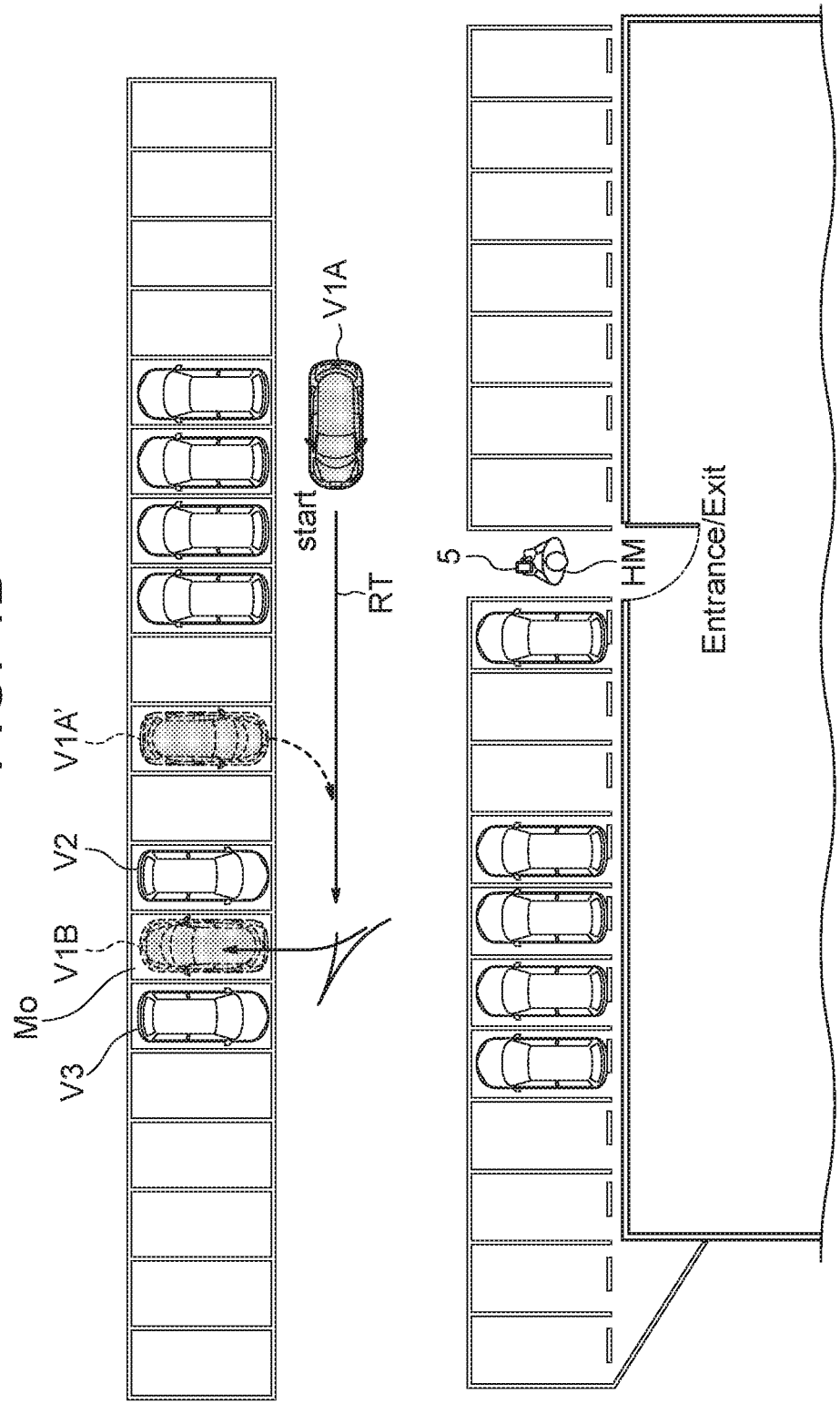

FIG. 5

| Communication environment level | Level 1 (normal) | > | Level 2 (bad) | > | Level 3 (very bad) |
|---|---|---|---|---|---|
| Parking assist control parameter | First parameter | | Second parameter | | Third parameter |
| Parking route calculation — Path length | LR1 | > | LR2 | > | LR3 |
| Distance1 to position of turn | CCR1 | > | CCR2 | > | CCR3 |
| Distance2 to position of turn | PCR1 | > | PCR2 | > | PCR3 |
| Width of clearance from object | CLR1 | > | CLR2 | > | CLR3 |
| Maximum curvature | MR1 | > | MR2 | > | MR3 |
| Maximum curvature change rate | CR1 | > | CR2 | > | CR3 |

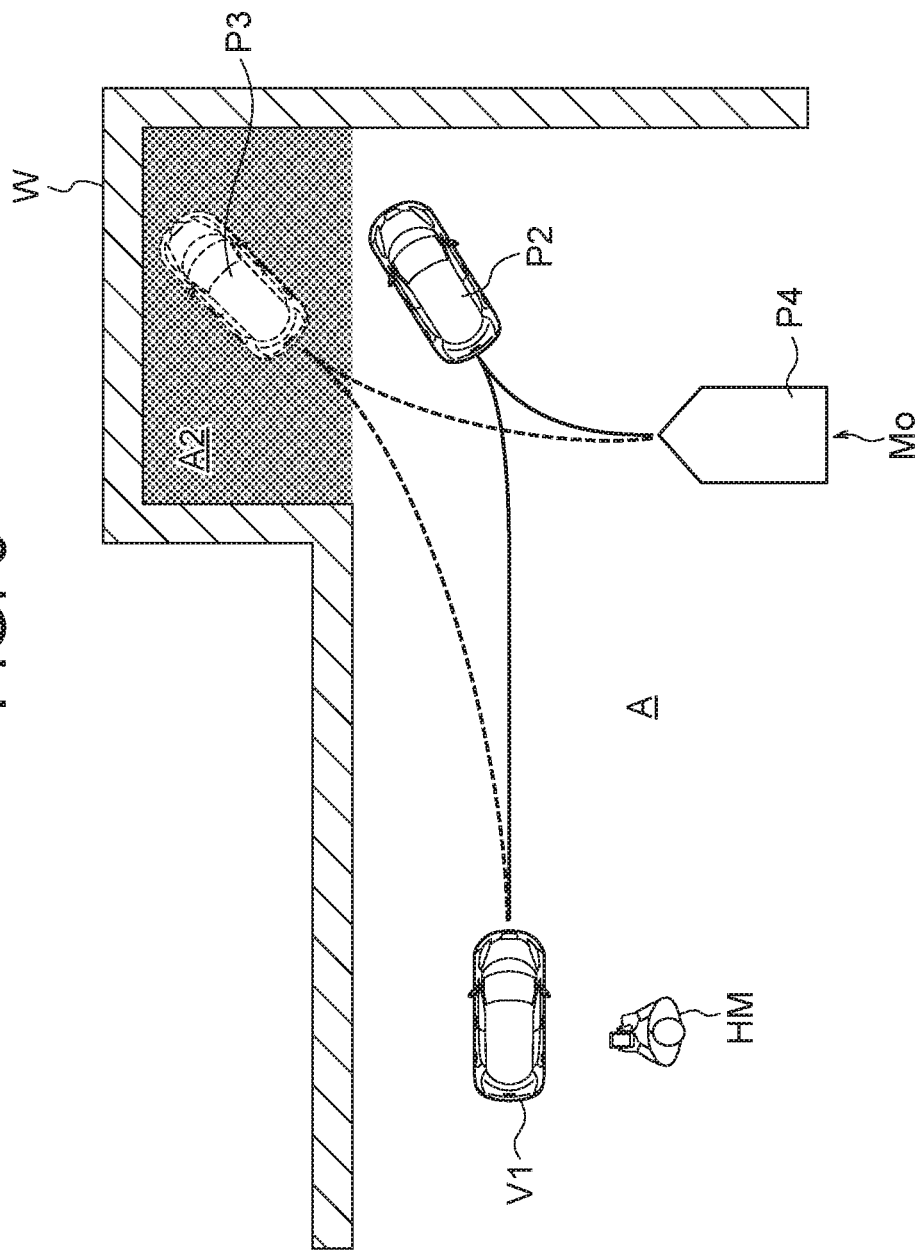

FIG. 9

| Communication environment level | Level 1 (normal) | > | Level 2 (bad) | > | Level 3 (very bad) |
|---|---|---|---|---|---|
| Parking assist control parameter | First parameter | | Second parameter | | Third parameter |
| Moving speed calculation — Speed | VR1 | > | VR2 | > | VR3 |
| Upper limit speed | UVR1 | > | UVR2 | > | UVR3 |
| Acceleration | AR1 | > | AR2 | > | AR3 |
| Upper limit acceleration | UAR1 | > | UAR2 | > | UAR3 |
| Deceleration | DR1 | > | DR2 | > | DR3 |
| Yaw rate | YR1 | > | YR2 | > | YR3 |
| Lateral acceleration | HAR1 | > | HAR2 | > | HAR3 |
| Steering amount | STR1 | > | STR2 | > | STR3 |
| Steering speed | SRR1 | > | SRR2 | > | SRR3 |
| Deceleration time for stopping | STRR1 | < | STRR2 | < | STRR3 | lane width [m], spot width [m], lat [m], init [deg], fin [deg]

PARKING CONTROL METHOD AND PARKING CONTROL DEVICE

TECHNICAL FIELD

The present invention relates to a parking control method and a parking control apparatus.

BACKGROUND

With regard to this kind of technique, a parking control apparatus is known which is configured such that, during the parking operation, a person located outside the vehicle can use a terminal device to check a video footage captured by an onboard camera (See Japanese Patent Application JP2015/54530).

In Japanese Patent Application JP2015/54530, however, nothing is contemplated for a case in which the communication environment around the vehicle is bad when the vehicle is parked by operating from outside of the vehicle.

SUMMARY

A problem to be solved by the present invention is to park a vehicle by appropriately controlling the vehicle from outside of the vehicle even when the communication environment around the vehicle is bad.

The present invention solves the above problem by controlling a vehicle from outside of the vehicle to park in accordance with the result of evaluation of the communication environment around the vehicle.

According to the present invention, the vehicle can be parked by appropriately controlling the vehicle from outside of the vehicle even when the communication environment around the vehicle is bad.

BRIEF DESCRIPTION OF THE DRAWINGS

FIG. 3B is a diagram for describing the reception characteristics of the antenna in the vertical plane according to one or more embodiments of the present invention;

FIG. 4A is a diagram for describing a first scene according to one or more embodiments of the present invention in which the communication environment varies;

FIG. 4B is a diagram for describing a second scene according to one or more embodiments of the present invention in which the communication environment varies;

FIG. 5 is a table illustrating an example of parameters used for calculation of a parking route;

FIG. 8 is a diagram for describing a processing example of calculating a parking route for avoiding a region in which the communication environment is bad;

FIG. 9 is a table illustrating an example of parameters used for calculation of control information for a vehicle;

DETAILED DESCRIPTION

Hereinafter, one or more embodiments of the present invention will be described with reference to the drawings. In the embodiments, the present invention will be described by exemplifying an example in which the parking control apparatus according to the present invention is applied to a parking control system equipped in a vehicle. The parking control apparatus may also be applied to a portable terminal device (equipment such as a smartphone or a personal digital assistant (PDA)) capable of exchanging information with onboard devices. The parking control method according to the present invention can be used in the parking control apparatus, which will be described below.

Figure 1:
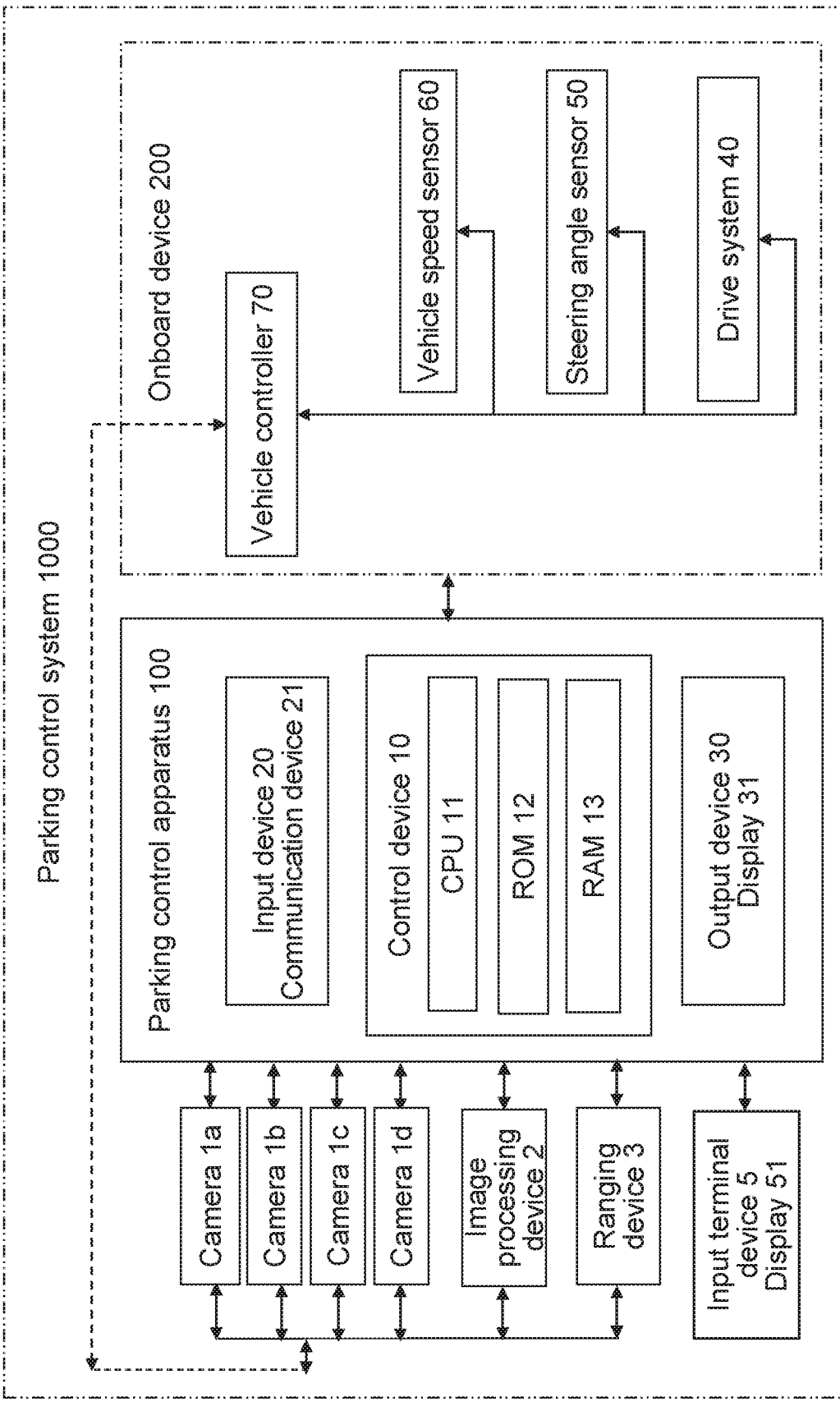
FIG. 1 is a block diagram illustrating an example of a parking control system according to one or more embodiments of the present invention.

FIG. 1 is a block diagram of a parking control system 1000 having a parking control apparatus 100 according to one or more embodiments of the present invention. The parking control system 1000 according to one or more embodiments of the present invention comprises cameras 1a to 1d, an image processing device 2, a ranging device 3, an input terminal device 5, the parking control apparatus 100, a vehicle controller 70, a drive system 40, a steering angle sensor 50, and a vehicle speed sensor 60. The parking control apparatus 100 according to one or more embodiments of the present invention controls an operation of moving (parking) the vehicle into a parking space on the basis of an operation command that is input from the input terminal device 5.

The input terminal device 5 is a portable terminal device that can be brought out to outside of the vehicle. The input terminal device 5 receives an input of an operation command for controlling the vehicle. The input terminal device 5 includes a communication device and is capable of exchanging information with the parking control apparatus 100. The input terminal device 5 transmits an operation command, which is input outside the vehicle, via a communication network to the parking control apparatus 100 and inputs the operation command to the parking control apparatus 100. The input terminal device 5 communicates with the parking control apparatus 100 using signals including a unique identification code. The input terminal device 5 detects the frequency of the communication radio wave to be transmitted and received and the establishment and disruption of the communication between the parking control apparatus 100 and a communication device 21.

The input terminal device 5 includes a display 51. The display 51 presents an input interface and various information items. When the display 51 is a touch panel-type display, it has a function of receiving an operation command.

The input terminal device 5 may be a portable device, such as a smartphone or a personal digital assistant (PDA), in which applications are installed for receiving an input of an operation command used in the parking control method according to one or more embodiments of the present invention and transmitting the operation command to the parking control apparatus 100.

The parking control apparatus 100 according to one or more embodiments of the present invention comprises a control device 10, an input device 20, and an output device 30. These components of the parking control apparatus 100 are connected to one another via a controller area network (CAN) or other in-vehicle LAN to mutually exchange information.

The input device 20 includes a communication device 21. The communication device 21 receives an operation command transmitted from the external input terminal device 5 and inputs the operation command to the input device 20. The subject which inputs the operation command to the external input terminal device 5 may be a person (a user, a passenger, a driver, or a worker of a parking facility) or may also be a machine (a management device) on the parking facility side. The input device 20 transmits the received operation command to the control device 10. The output device 30 includes a display 31.

The output device 30 notifies the driver of parking control information. The display 31 according to one or more embodiments of the present invention is a touch panel-type display having an input function and an output function. When the display 31 has an input function, the display 31 serves as the input device 20.

Even when the vehicle is controlled on the basis of the operation command which is input from the input terminal device 5, an occupant (driver or passenger) can input an operation command, such as a command for emergency stop, via the input device 20.

The control device 10 of the parking control apparatus 100 according to one or more embodiments of the present invention is a specific computer comprising a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program that executes a control procedure to evaluate the communication environment around the vehicle and control the vehicle to park in accordance with the result of the evaluation. This program is executed by the control device 10 of the parking control apparatus 100 according to one or more embodiments of the present invention.

The parking control apparatus 100 according to one or more embodiments of the present invention is a remote control-type apparatus that receives an operation command from external and controls the movement of the vehicle to park into a given parking space. During this operation, the occupant may be present outside the vehicle or may also be present inside the vehicle.

The parking control apparatus 100 according to one or more embodiments of the present invention may be of an automatic control type in which the steering operation and the accelerator/brake operation are automatically performed.

The parking control apparatus 100 may also be of a semi-automatic type in which the steering operation is automatically performed and the driver performs the accelerator/brake operation.

In the parking control program according to one or more embodiments of the present invention, the user may arbitrarily select a target parking space, or the parking control apparatus 100 or the parking facility side may automatically set a target parking space.

The control device 10 of the parking control apparatus 100 according to one or more embodiments of the present invention has functions of executing an operation command acquisition process, a communication environment evaluation process, and a parking control process. Each of the above processes is executed by cooperation of software for implementing the process and the above-described hardware.

When executing the parking control method for controlling the vehicle on the basis of an operation command acquired from outside of the vehicle, the control device 10 according to one or more embodiments of the present invention evaluates the communication environment around the vehicle and controls the vehicle to park using a control method in accordance with the result of the evaluation. The control device 10 evaluates the communication environment, generates a parking route in accordance with the communication environment, calculates the control content in accordance with the communication environment, and controls the vehicle to park into a given parking space on the basis of the above.

The vehicle is controlled to park in accordance with the result of evaluation of the communication environment around the vehicle and, therefore, even in a location in which satisfactory communication cannot be performed due to the surrounding environment, lack of communication infrastructure, disturbance, etc., the vehicle can be parked by a method adapted to the communication environment.

Figure 2:
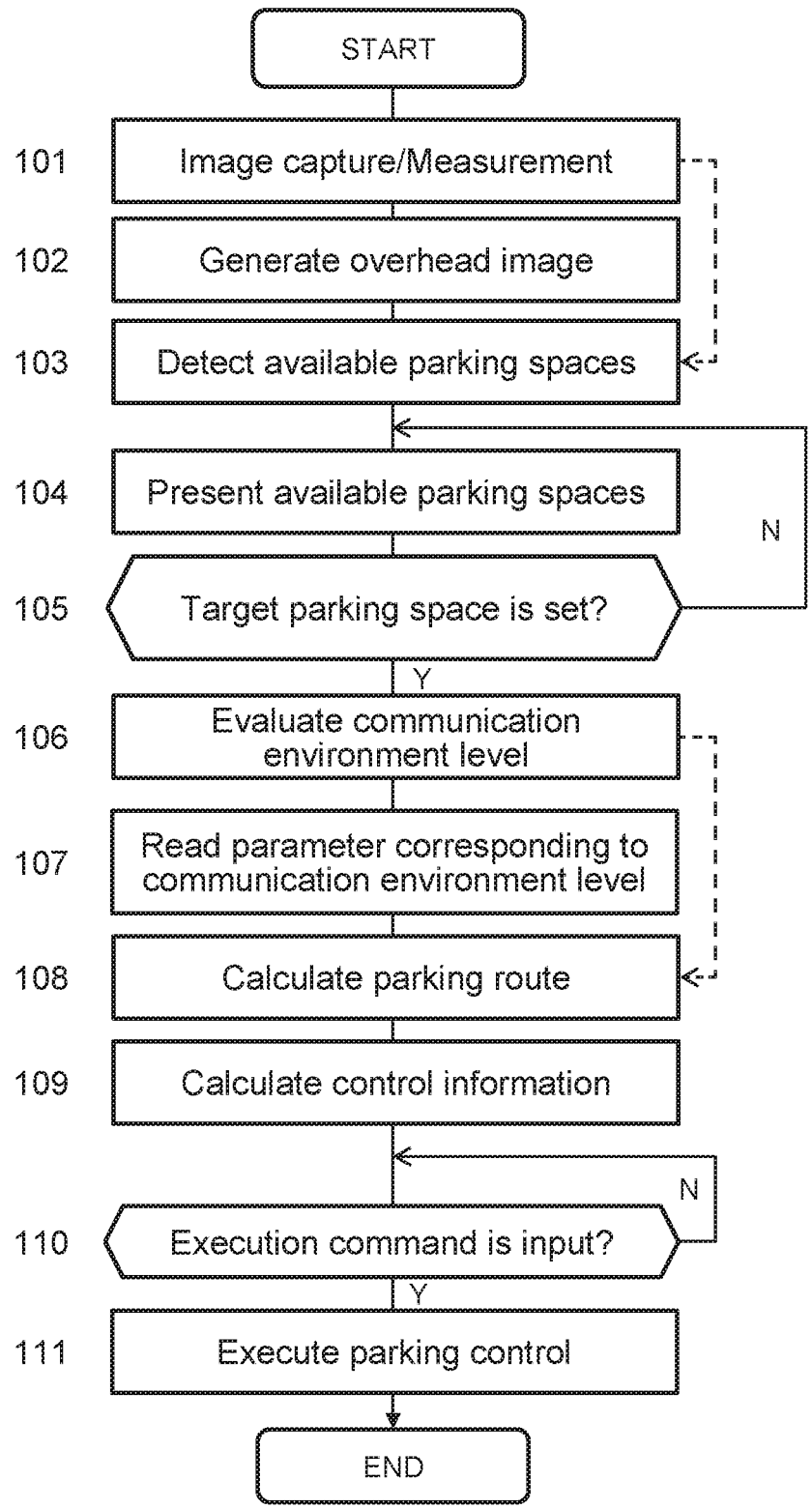
FIG. 2 is a flowchart illustrating an example of a control procedure in the parking control system according to one or more embodiments of the present invention.

FIG. 2 is a flowchart illustrating a control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of automatically moving a vehicle V to a parking space on the basis of an operation command acquired from outside of the vehicle.

In step 101, the control device 10 of the parking control apparatus 100 according to one or more embodiments of the present invention acquires images captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 101, the control device 10 also acquires ranging signals from the ranging device 3, which may be a plurality of modules attached to multiple sites of the vehicle V.

The ranging device 3 may be provided at the same position as any of the cameras 1a to 1d or may also be provided at a different position. The ranging device 3 may be a radar device, such as a millimeter-wave radar, a laser radar or an ultrasonic radar, or a sonar. The ranging device 3 detects the presence or absence of objects, positions of the objects, sizes of the objects, and distances to the objects on the basis of the received signal of the radar device. Such objects include installed subjects, pedestrians, other vehicles, and parked vehicles around the vehicle. The received signal is used to make a determination whether or not the parking space is empty (whether or not a vehicle is parked in the parking space). Obstacles may be detected using the motion stereo technique by the cameras 1a to 1d.

In step 102, the control device 10 of the parking control apparatus 100 controls the image processing device 2 to generate an overhead image. On the basis of the acquired plurality of captured images, the image processing device 2 generates an overhead image in which the surrounding state including the vehicle V and the parking space for the vehicle V to park is viewed from a virtual viewpoint above the vehicle V. Step 101 may be followed by step 103 without creating an overhead image.

In step 103, the control device 10 detects parking spaces into which parking is possible. The control device 10 detects white lines on the basis of the captured images from the cameras 1a to 1d. The white lines are boundary lines that define frames (areas) of parking spaces. The control device 10 performs edge detection on the captured images and detects the parking spaces on the basis of the luminance difference (contrast). After detecting the parking spaces, the control device 10 detects empty parking spaces in accordance with the following parking available condition using the detection data of the ranging device 3/image processing device 2. The control device 10 detects parking available spaces from among the parking spaces. The parking available spaces are parking spaces which are empty (i.e., other vehicles are not parked) and to which routes for completing the parking can be derived. The condition that a route can be derived means that a trajectory of the route can be rendered on road surface coordinates without interfering with obstacles (including parked vehicles). In practice, an accurate parking route for controlling the vehicle is derived after a target parking space is set.

In step 104, the control device 10 transmits the parking available spaces to the input terminal device 5, which is controlled to display the parking available spaces on the display 51. The parking available spaces may be superimposed on the overhead view image based on the captured images and displayed thereon.

Then, communication with the input terminal device 5 is established and an operation command acquisition process is executed. The target parking space is a parking space into which the vehicle is parked by automated driving, and represents a target position in the automated driving. The target parking space is input via the input terminal device 5. For example, when the display 51 is a touch panel-type display, the user can touch the portion of a desired parking space thereby to select one target parking space. Identification information of the selected target parking space is transmitted to the parking control device 100 and input to the control device 10.

When, in step 105, an operation command that specifies one parking space is input to the input terminal device 5, the parking space is set as the target parking space. Until a target parking space Mo is input, the control flow returns to step 104 and waits for the input of an operation command. The operation command includes any one of activation of the parking control device 100, selection of a target parking space, and an execution command for the parking control.

In step 106, the communication environment evaluation process is executed. The control device 10 evaluates the communication environment around the vehicle. The term "around the vehicle" refers to a region that includes at least the position of the vehicle and the position of a parking space in which the vehicle may be parked. The entire parking lot which is intended to be used for the vehicle may be "around the vehicle," or a region in which the distance from the vehicle is less than a predetermined distance may be "around the vehicle."

Figure 3A:
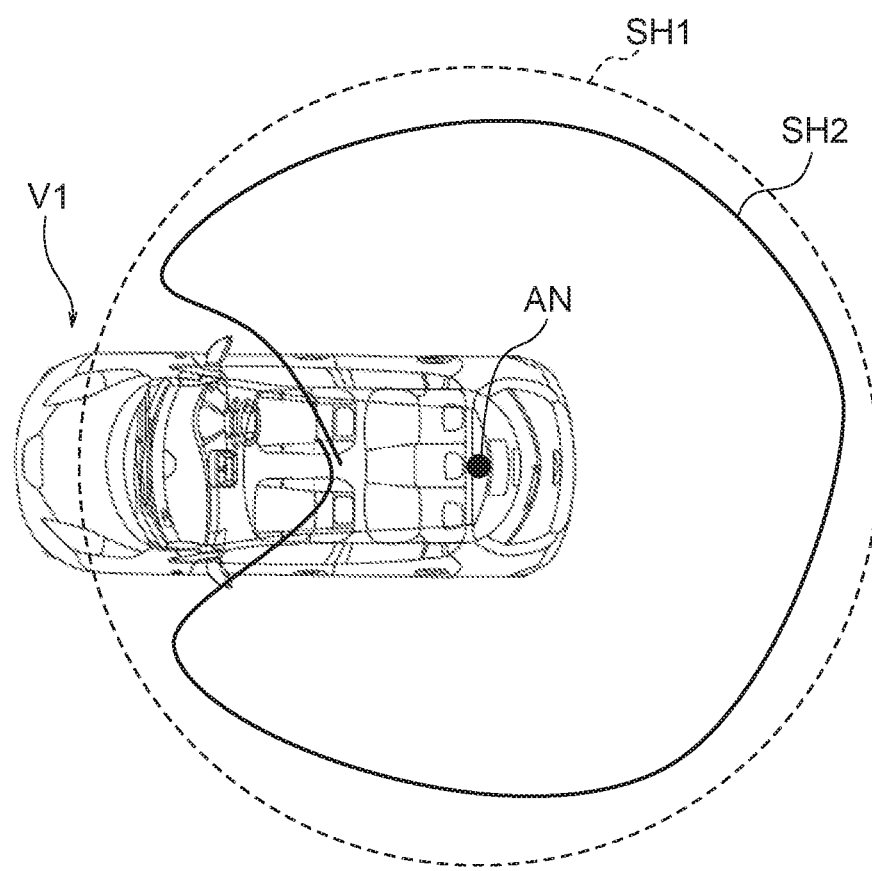
FIG. 3A is a diagram for describing the reception characteristics of an antenna in the horizontal plane according to one or more embodiments of the present invention.

FIG. 3A and FIG. 3B are diagrams for describing the reception characteristics of an antenna AN of the communication device 21 equipped in a vehicle V1. The antenna AN of this example is a nondirectional whip antenna capable of receiving radio waves from all directions. FIG. 3A illustrates reception characteristics SH1 and SH2 in the horizontal plane and FIG. 3B illustrates the reception characteristics SH1 and SH2 in the vertical plane. The antenna AN is arranged along the vertical direction. The reception characteristics SH1 illustrated in FIG. 3A and FIG. 3B are ideal reception characteristics of the antenna AN alone. The reception characteristics SH2 illustrated in FIG. 3A and FIG. 3B are reception characteristics affected by the orientation of the input terminal device 5 due to interference with the vehicle body. The reception characteristics of the antenna AN vary depending on the orientation of the input terminal device 5, that is, the orientation of the input terminal device 5 with respect to the vehicle V1 (onboard antenna AN). In other words, the reception characteristics of the antenna AN of the vehicle V1 are affected by the vehicle body and, therefore, also vary depending on the positional relationship between the vehicle V1 and the input terminal device 5. Furthermore, the reception characteristics of the antenna AN are affected by objects (other vehicles, structures, installed subjects, etc.) other than the vehicle V1.

With reference to FIG. 4A to FIG. 4D, some scenes will be described in which the reception characteristics of the antenna AN vary and the communication environment varies depending on the position and orientation of the input terminal device 5, the position of the vehicle V1, and the presence and positions of objects. FIG. 4A to FIG. 4D illustrate scenes in which an operator HM located near the entrance/exit remotely controls a vehicle V1A from outside of the vehicle interior to park the vehicle V1A into a target parking space Mo.

In the scene illustrated in FIG. 4A, the operator HM controls the vehicle V1A to move from the start position along a route RT indicated by the arrow and park the vehicle V1A into the target parking space Mo. In this scene, no objects affecting the reception characteristics are present between the vehicle V1 (antenna AN) moving along the route from the start position to the target parking space Mo and the input terminal device 5 operated by the operator HM.

In the scene illustrated in FIG. 4B, the operator HM controls the vehicle V1A to move from the start position along a route RT indicated by the arrow and park the vehicle V1A into the target parking space Mo. An alternative scene may also be possible in which the vehicle V1A' parked in FIG. 4A is controlled to move from the start position along the route indicated by the arrow and park into the target parking space Mo. In such scenes, other vehicles V2 and V3 are present adjacent to the target parking space Mo. The other vehicles V2 and V3 are objects that affect the reception characteristics of the vehicle V1 (antenna AN).

Figure 4C:
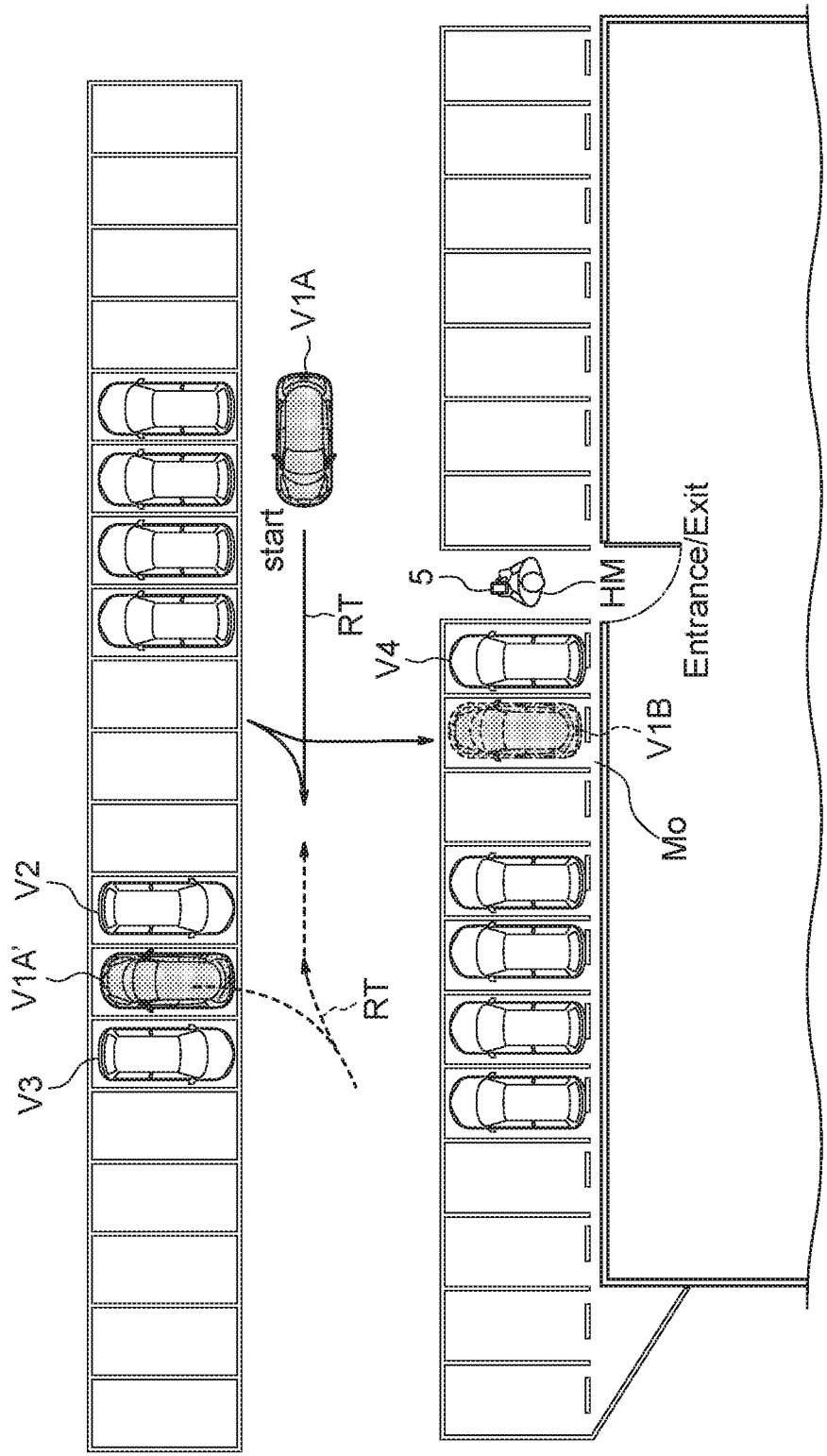
FIG. 4C is a diagram for describing a third scene according to one or more embodiments of the present invention in which the communication environment varies.

In the scene illustrated in FIG. 4C, the operator HM controls the vehicle V1A to move from the start position along a route RT indicated by the arrow and park the vehicle V1A into the target parking space Mo. An alternative scene may also be possible in which the vehicle V1A' parked in FIG. 4B is controlled to move from the start position along the route indicated by the arrow and park into the target parking space Mo. In such scenes, another vehicle V4 is present between the target parking space Mo and the input terminal device 5 operated by the operator HM. The vehicle V1 (antenna AN) is hidden in the shadow of the other vehicle 4 as seen from the input terminal device 5.

Figure 4D:
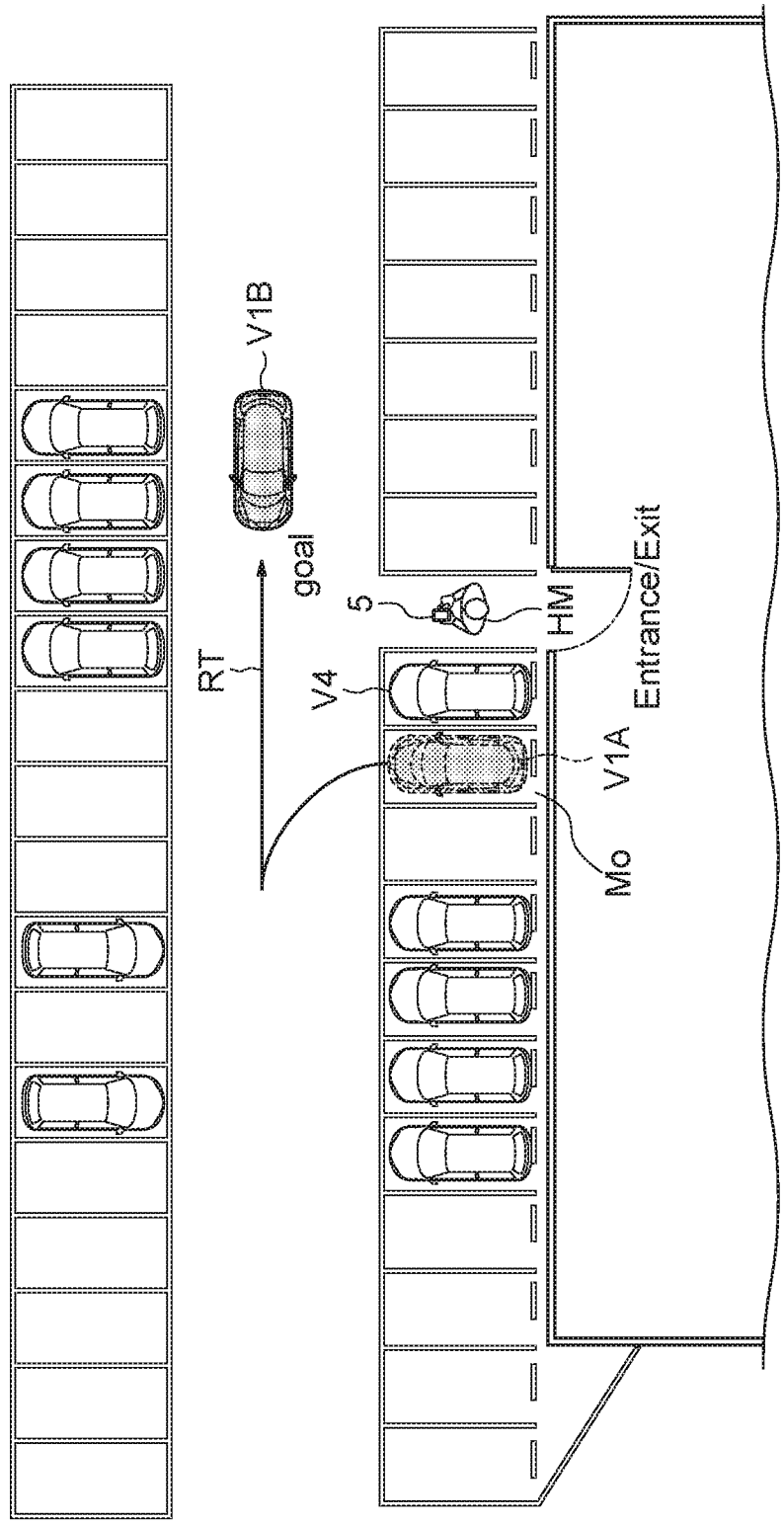
FIG. 4D is a diagram for describing a fourth according to one or more embodiments of the present invention scene in which the communication environment varies.

In the scene illustrated in FIG. 4D, the operator HM controls the vehicle VA1 parked in the scene of FIG. 4C to move from the target parking space Mo to the position of goal along a route RT indicated by the arrow. This is based on the operation of controlling the vehicle VA1 to exit the parking space and move to a place close to the operator. The parking control method according to one or more embodiments of the present invention includes not only a method of controlling the vehicle V1 to enter a parking space but also a method of controlling the vehicle V1 to exit the parking space and move to a given place. In such scenes, another vehicle V4 is present between the target parking space Mo as the start position and the input terminal device 5 operated by the operator HM. At the start of the operation, the vehicle V1 (antenna AN) is hidden in the shadow of the other vehicle 4 as seen from the input terminal device 5.

Thus, the position and orientation of the input terminal device 5, the start position of the vehicle V1, the position of the target parking space, and the position and size of an object affect the reception characteristics of the antenna and vary the communication environment around the vehicle.

In one or more embodiments of the present invention, the following schemes are proposed as those for evaluating the communication environment around the vehicle V1.

(1) When evaluating the communication environment around the vehicle V1, the control device 10 evaluates the level of the communication environment in accordance with the positional relationship between the vehicle V1 and the input terminal device 5 which transmits an operation command.

The control device 10 evaluates that the communication state is worse as the distance between the input terminal device 5 and the vehicle V1 (antenna AN) is longer. The free space propagation loss at a distance d [m] from an isotropic antenna depends on the distance d. As the distance between the input terminal device 5 and the vehicle V1 (antenna AN) increases, the communication state gets worse due to the free space propagation loss. Accordingly, the level of the communication environment is evaluated to be lower as the distance between them is longer.

The reception characteristics (sensitivity/radio field intensity) of the antenna AN are different depending on the angle of the radio wave communication direction of the input terminal device 5 with respect to the traveling direction of the vehicle V1. The tendency of the reception characteristics (sensitivity/radio field intensity) of the antenna AN depending on the angle of the orientation of the input terminal device 5 (radio wave communication direction) with respect to the traveling direction of the vehicle V1 is constant. The control device 10 refers to the relationship between the angle of the input terminal device 5 with respect to the orientation of the vehicle V1 (traveling direction) and the communication characteristics, which is preliminarily collected, and estimates the communication characteristics from the angle of the input terminal device 5 with respect to the orientation of the vehicle V1 (traveling direction). The control device 10 evaluates the level of the communication environment on the basis of the estimated communication characteristics.

This variation of the communication characteristics is due to the influence of interference with the vehicle body of the vehicle V1, as previously described with reference to FIGS. 3A and 3B. It is highly possible that the antenna of the input terminal device 5 is nondirectional, and the influence of the orientation of the input terminal device appears to be low. The control device 10 defines the angle formed by the traveling direction of the vehicle V1 and the line segment connecting the vehicle V1 and the input terminal device 5 as the "orientation of the vehicle V1." The "orientation (angle) of the vehicle V1" and the reception characteristics (sensitivity/radio field intensity) of the onboard antenna AN are preliminarily associated with each other. The control device 10 refers to the relationship between the "orientation of the vehicle V1" and the communication characteristics, which is preliminarily collected, and estimates the communication characteristics based on the actual orientation of the vehicle V1. The actual orientation of the vehicle V1 is acquired on the basis of the position of the vehicle V1, the steering amount acquired from the steering angle sensor 50, and the output signal of a gyro sensor.

Upon evaluation of the communication environment around the vehicle V1, the level of the communication environment is evaluated in accordance with the positional relationship (e.g. the distance and direction) between the vehicle V1 and the input terminal device 5 which transmits an operation command, and it is thereby possible to properly evaluate the communication environment when the remote parking process is performed using the input terminal device 5.

(2) When evaluating the communication environment around the vehicle V1, the control device 10 detects objects around the vehicle V1 and evaluates the level of the communication environment on the basis of the detection results of the objects. The control device 10 can recognize the positions of objects, the number of the objects, the sizes of the objects, etc. on the basis of the images captured by the cameras 1a to 1d and/or the detection signals from the ranging device 3.

The degree of deterioration in the level of the communication environment due to the presence of an object may be obtained by simulation on the loss amount of the free space propagation loss (the ratio of electric power transmitted through the free space) due to the presence of the object on the basis of the positional relationship between the vehicle V1 and the input terminal device 5.

Multipath interference generated by an object in the vicinity of the input terminal device 5 and an object in the vicinity of the vehicle V1 (antenna AN) affects the communication between the input terminal device 5 and the antenna AN and deteriorates the level of the communication environment.

The influence of multipath interference is estimated to be greater as the size of the object in the vicinity of the input terminal device 5 and the size of the object in the vicinity of the vehicle V1 (antenna AN) are larger and, therefore, the level of the communication environment is evaluated to be low.

The influence of multipath interference is also estimated to be greater as the number of objects in the vicinity of the input terminal device 5 and the number of objects in the vicinity of the vehicle V1 (antenna AN) are larger and, therefore, the level of the communication environment is evaluated to be low.

Upon evaluation of the communication environment around the vehicle V1, objects around the vehicle V1 are detected, the level of the communication environment is evaluated in accordance with the detection results of the objects, and it is thereby possible to properly evaluate the communication environment when the remote parking process is performed using the input terminal device 5.

Specifically, the control device 10 evaluates that the level of the communication environment is lower as the distance between an object and the input terminal device 5 which transmits the operation command is shorter. In addition or alternatively, the control device 10 evaluates that the level of the communication environment is lower as the distance between the vehicle V1 and an object is shorter.

Upon evaluation of the communication environment around the vehicle V1, the level of the communication environment is evaluated to be lower as the distance between the input terminal device 5 and an object is shorter or as the distance between the vehicle 1 and an object is shorter, and it is thereby possible to properly evaluate the communication environment when the remote parking process is performed, with consideration for the disturbance of multipath interference by the object.

(3) When evaluating the communication environment around the vehicle V1, the control device 10 refers to communication environment information 131 that is preliminarily associated with the position information, and evaluates the communication environment around the vehicle V1 on the basis of the communication environment information around the vehicle V1. The communication environment information 131 may be read from an external database or may also be read from a database stored in the RAM 13.

The communication environment information 131 is information in which the level of the communication environment is associated with the map information. According to the communication environment information 131, it is possible to obtain a communication environment level for each point. The level of the communication environment is evaluated on the basis of the number of access points of Wifi within a predetermined region including a certain point and/or the population density within a predetermined region including a certain point. The higher the number/density of Wifi access points, the higher the level of the communication environment is evaluated. The higher the population density, the lower the level of the communication environment is evaluated. By determining the communication environment level based on both the number of the Wifi access points and the population density, even when the number of the Wifi access points is larger than a predetermined number in the vicinity of a downtown area or the like, the level of the communication environment can be evaluated to be low in a densely-populated area with a certain population density or more. When the number of the Wifi access points is less than a predetermined value in a less-populated area or the like, the level of the communication environment can be evaluated to be low even when the population density is less than a predetermined value.

In the communication environment information 131, the map information may be associated with the regional attributes (mountains, forests, parks), the number of high-rise buildings, the height of the high-rise buildings, or the level of the communication environment determined on the basis thereof.

In the communication environment information 131, the map information may be associated with the number of reception signals from the global positioning system (GPS) (the number of satellites capable of receiving signals), the reception status of televisions (carrier-to-noise ratio: C/N ratio), the reception status of radio receivers (signal-to-noise ratio: S/N ratio), or the level of the communication environment determined on the basis thereof.

In the communication environment information 131, the map information may be associated with the evaluation history of the communication environment observed at each point. The evaluation history of the communication environment may be any of histories of those which were observed in past times, such as the regional attributes (mountains, forests, parks), the number of high-rise buildings, the height of the high-rise buildings, the number of reception signals received by GPS receivers (the number of satellites capable of receiving signals), the reception status of televisions, and the reception status of radio receivers.

The evaluation history of the communication environment may be a history of communication disruption observed in past times. The history of communication disruption is recorded on the map information such that the fact that the communication disruption occurs when using the parking control apparatus 100 according to one or more embodiments of the present invention and the point at which the communication disruption occurs are associated with each other. This allows the level of the communication environment to be evaluated on the basis of the history of the actual communication environment.

By referring to the communication environment information 131 which is preliminarily associated with the positional information and evaluating the communication environment around the vehicle V1 on the basis of the communication environment information around the vehicle V1, the communication environment can be evaluated with consideration for the status (attribute) of each point and the fact that the communication disruption occurred in past times.

(4) When evaluating the communication environment around the vehicle V1, the control device 10 evaluates the level of the communication environment in accordance with the unoccupied situation of a band (frequency band) of the communication radio wave used around the vehicle V1. A band of the communication radio wave being unoccupied refers to a situation in which the communication radio wave of the band is not transmitted and received (not used). The scheme of determining the unoccupied situation of a band of the communication radio wave is not particularly limited, and the unoccupied situation may be determined on the basis of the number of unused bands of the communication radio wave. The control device 10 plots the radio field intensity (Y) of the received radio wave for each frequency/frequency band (X). The density of the plot number for each frequency/frequency band (X) is calculated, and the frequency/frequency band of which the density is zero or less than a predetermined value is determined as an unused communication band (communication band is a frequency band used for communication). When the number of the unused communication bands is a predetermined value TH1 or more, a determination is made that the unoccupied situation of the band of the communication radio wave is high and the communication environment level is high. On the other hand, when the number of the unused communication bands is less than a predetermined value TH2, a determination is made that the unoccupied situation of the band of the communication radio wave is low and the communication environment level is low.

When evaluating the communication environment around the vehicle V1, the level of the communication environment is evaluated in accordance with the unoccupied situation of a band of the communication radio wave used around the vehicle V1 and, therefore, the communication environment can be accurately evaluated on the basis of the actual communication situation.

(5) When evaluating the communication environment around the vehicle V1, the control device 10 evaluates the level of the communication environment on the basis of the disruption state of communication around the vehicle V1. The method of determining the disruption state of the communication radio wave is not particularly limited, but when the disruption time of communication is a certain determination threshold or more, the communication radio wave is determined to be in a disruption state. In addition or alternatively, when the occurrence frequency (number of occurrences/unit time) of the disruption states of the radio wave reception is a certain determination threshold or more, the communication is determined to be in a disruption state.

By evaluating the level of the communication environment on the basis of the disruption state of the communication radio wave around the vehicle V1, it is possible to evaluate the communication environment on the basis of the actual situation.

The control device 10 may determine that the level of the communication environment is lower as the disruption time of communication is longer. The values of parameters to be described later can be set in accordance with the length of the disruption time of communication. For example, as the disruption time of communication increases, the control device 10 can shorten the length of the parking route, shorten the distance to the position of turn for parking (including the position at which the vehicle makes a stop after moving forward and then starts moving back, here and hereinafter), increase the width of a clearance from an object, and/or reduce the maximum curvature/maximum curvature change rate.

In this process, when the level of the communication environment is evaluated to be low, the evaluation threshold for evaluating the disruption state may be set to a different value. The control device 10 changes the determination threshold for the communication disruption in accordance with the level of the communication environment. For the region in which the level of the communication environment is evaluated to be less (lower) than a predetermined value using any of the above-described other evaluation schemes, the determination threshold for the communication disruption is changed to a high value. For example, the determination threshold when the communication environment level is a relatively better value of L1 (L1>L2>L3) is TH1, the determination threshold when the communication environment level is a relatively worse value of L2 is TH2, and the determination threshold when the communication environment level is a bad value of L3 is TH3. The relation of the determination thresholds is TH1<TH2<TH3. By adjusting the determination threshold so that the occurrence of communication disruption is more likely to be determined as the communication environment level is lower (worse), the communication disruption can be determined with a high degree of sensitivity.

When the level of the communication environment is evaluated to be low, by setting the evaluation threshold for evaluating the disruption state so that the occurrence of communication disruption is more likely to be determined, the occurrence of the communication disruption can be determined with a high degree of accuracy.

When the level of the communication environment is evaluated to be low, the control device 10 changes the frequency at which the operation command is transmitted and received. By changing the frequency, the communication environment can be improved.

When the parking route is longer than a predetermined value and level of the communication environment is evaluated to be low, the control device 10 changes the used frequency to another frequency.

When the number of the detected objects is larger than a predetermined value and the level of the communication environment is evaluated to be low, the control device 10 changes the used frequency to another frequency.

After evaluating the level of the communication environment in step 106, the routine proceeds to step 107. In step 107, parameters corresponding to the communication environment level are read. These parameters are used when calculating the parking route in the subsequent step 108. Step 106 may be followed by step 108 in which the parking route is calculated using normal parameters.

In step 107, the control device 10 acquires parameters for calculating a parking route for the vehicle V1 to move to a target parking space Mo. The parameters are set for each communication environment level. The control device 10 reads parameters corresponding to the level of the communication environment evaluated in step 106. FIG. 5 illustrates an example of the parameters used for calculating the parking route.

These parameters include any one or more of the length of the parking route, the distance to the position of turn for parking, the width (length) of the clearance from an object, the maximum curvature of the parking route, and the maximum curvature change rate of the parking route.

Each parameter is set for each communication environment level. A first parameter is set for a communication environment level 1 (normal), a second parameter is set for a communication environment level 2 (relatively worse than the communication environment level 1), and a third parameter is set for a communication environment level 3 (relatively worse than the communication environment level 2, i.e., very bad). In this example, the communication environment levels and the parameters are classified into three stages, but the number of stages is not limited.

By calculating the parking route using a parameter corresponding to the level of the communication environment, even when the communication environment is bad, the vehicle can be parked along the route adapted to the communication environment.

In one or more embodiments of the present invention, the following schemes are proposed as those for calculating a parking route in accordance with the communication environment.

(1) When the level of the communication environment is evaluated to be low, the control device 10 calculates a parking route having a shorter path length than when the level of the communication environment is not evaluated to be low. As illustrated in FIG. 5, for the length of the parking route, a first parameter LR1, a second parameter LR2, and a third parameter LR3 are set (LR1>LR2>LR3). As illustrated in the figure, a shorter path length is associated as the communication environment level is lower.

Figure 6A:
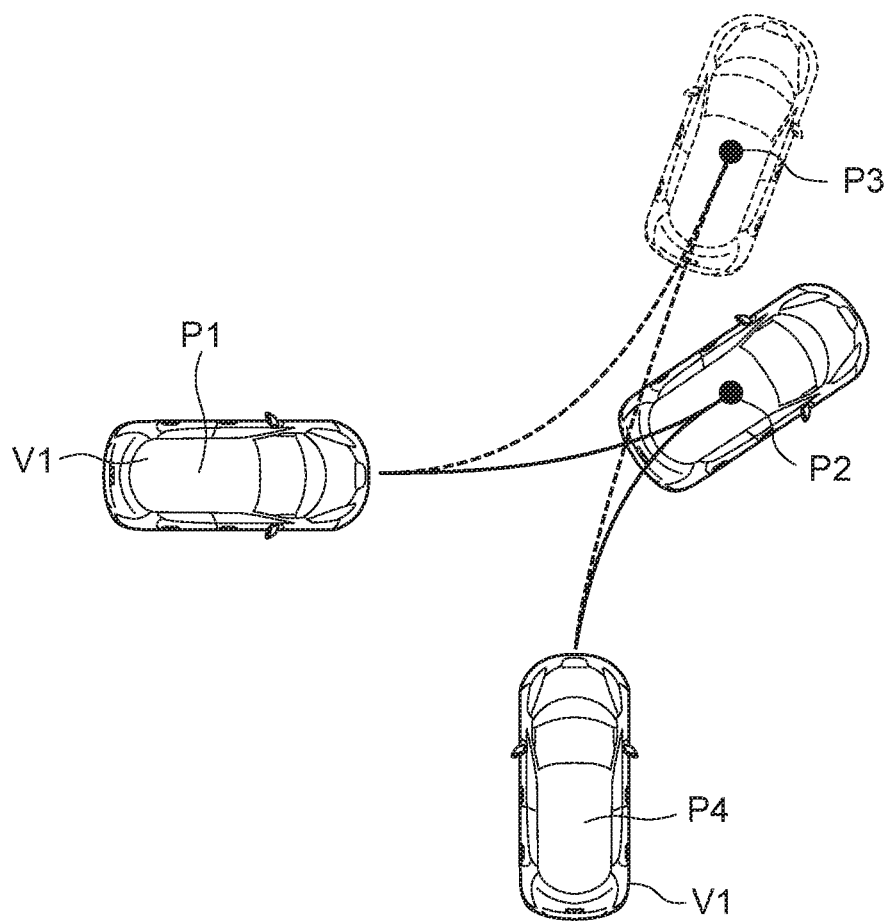
FIG. 6A is a diagram illustrating a first calculation example of a parking route.

This will be described with reference to FIG. 6A. As illustrated in the figure, a case will be discussed in which the vehicle V1 moves forward from a position P1 to a position P2 or a position P3, makes a stop, and then moves back to park to a position P4. When the communication environment is good, the first parameter is used to generate a parking route that follows the position P1, the position P3, and the position P4. On the other hand, when the communication environment is bad, the second or third parameter is used to generate a parking route that follows the position P1, the position P2, and the position P4.

Thus, by generating a parking route having a shorter path length as the level of the communication environment is lower, it is possible to reduce the risk of occurrence of communication disruption when moving along the parking route.

Further, as illustrated in FIG. 5, the parameters include the maximum curvature of the parking route and the maximum curvature change rate of the parking route. When the level of the communication environment is evaluated to be low, the maximum curvature and maximum curvature change rate of lower values than when the communication environment level is not evaluated to be low are set. As illustrated in FIG. 5, for the maximum curvature, a first parameter MR1, a second parameter MR2, and a third parameter MR3 are set (MR1>MR2>MR3). For the maximum curvature change rate, a first parameter CR1, a second parameter CR2, and a third parameter CR3 are set (CR1>CR2>CR3). Although duplicated description will be omitted, the parameters relating to the maximum curvature and maximum curvature change rate can be used for calculation of a parking route together with the above-described path length, distances 1 and 2 to the position of turn for parking, which will be described later, and the width of a clearance from an object.

(2) When the level of the communication environment is evaluated to be low, the control device 10 calculates a parking route having a shorter distance from a position P0 of the input terminal device 5 used by the operator HM to the position of turn for parking P2, P3 than when the level of the communication environment is not evaluated to be low. As illustrated in FIG. 5, for the distance 1 from the input terminal device 5 to the position of turn for parking, a first parameter CCR1, a second parameter CCR2, and a third parameter CCR3 are set (CCR1>CCR2>CCR3). As illustrated in the figure, the lower the communication environment level, the shorter the distance 1 from the input terminal device 5 to the position of turn for parking is set.

Figure 6B:
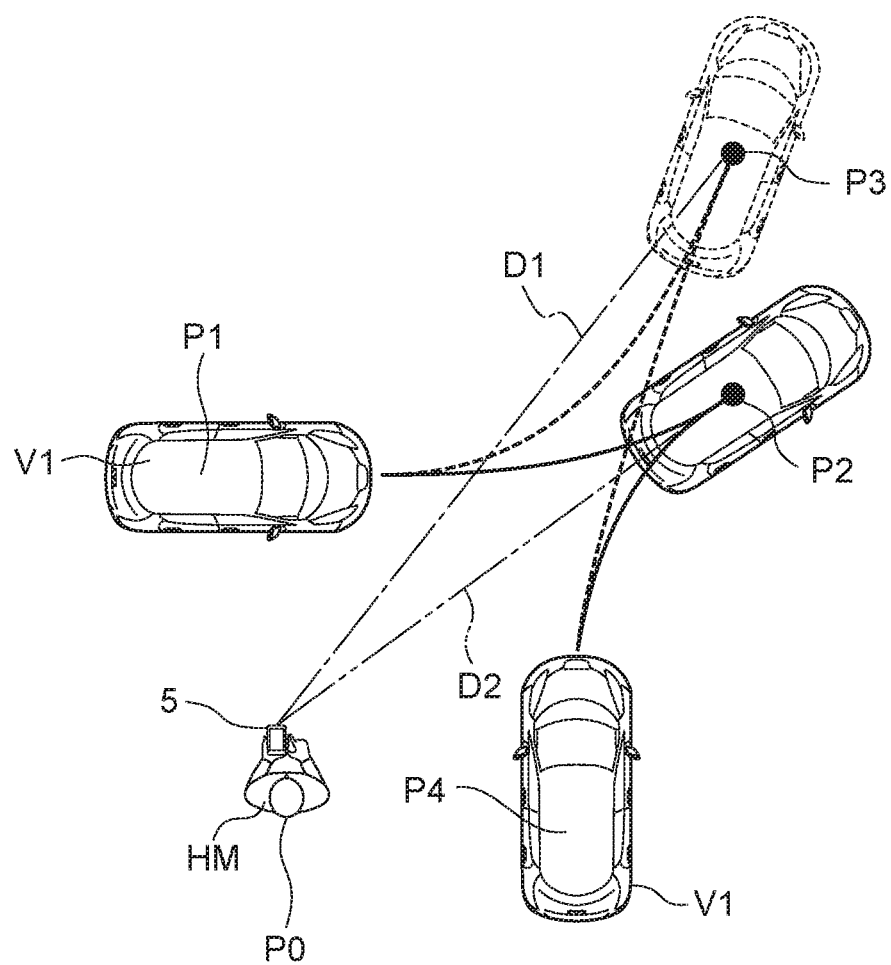
FIG. 6B is a diagram illustrating a second calculation example of a parking route.

This will be described with reference to FIG. 6B. As illustrated in the figure, a case will be discussed in which the vehicle V1 starts from a position P1, once turns at a position P2 or a position P3 for parking (including a process of making a stop after forward movement and then moving back, here and hereinafter), and parks to a position P4. When the communication environment is good, the first parameter is used. This allows the parking route to be generated which follows the position P1, the position P3, and the position P4 and in which the distance from the input terminal device 5 to the position of turn for parking is D1. On the other hand, when the communication environment is bad, the second or third parameter is used. This allows the parking route to be generated which follows the position P1, the position P2, and the position P4 and in which the distance from the input terminal device 5 to the position of turn for parking is D2 (D2<D1). The lower the communication environment level, the shorter the distance from the input terminal device 5 to the position of turn for parking is set. As a result, the lower the level of the communication environment, the shorter the path length of the parking route can be calculated.

Thus, by generating a parking route having a shorter distance from the input terminal device 5 to the position of turn for parking as the level of the communication environment is lower, the operation of turn for parking can be performed at a point nearer to the input terminal device 5/user. This results in a shortened parking route and it is therefore possible to reduce the risk of occurrence of communication disruption when moving along the parking route.

(3) When the level of the communication environment is evaluated to be low, the control device 10 calculates a parking route in which the position of turn for parking is shifted to the upstream side (vehicle side) than when the level of the communication environment is not evaluated to be low. As illustrated in FIG. 5, for the distance 2 from the start point of the parking route to the position of turn for parking, a first parameter PCR1, a second parameter PCR2, and a third parameter PCR3 are set (PCR1>PCR2>PCR3). As illustrated in the figure, the lower the communication environment level, the shorter the distance 2 to the position of turn for parking (distance from the start point of the parking route) is set.

Although not illustrated, when the communication environment is good, the first parameter is used to set PCR1 as the distance from the start point of the parking route to the position of turn for parking, while when the communication environment is bad, the second or third parameter is used to set PCR2 or PCR2 as the distance from the start point of the parking route to the position of turn for parking.

Thus, by generating a parking route having a shorter distance from the start point of the parking route to the position of turn for parking as the level of the communication environment is lower, the operation of turn for parking can be performed at a point nearer to the input terminal device 5/user. This results in a shortened parking route and it is therefore possible to reduce the risk of occurrence of communication disruption when moving along the parking route.

(4) When the level of the communication environment is evaluated to be low, the control device 10 calculates the parking route under a condition in which the width of a clearance from an object is extended than when the level of the communication environment is not evaluated to be low. As illustrated in FIG. 5, for the width of a clearance from an object, a first parameter CLR1, a second parameter CLR2, and a third parameter CLR3 are set (CLR1>CLR2>CLR3). As illustrated in the figure, the lower the communication environment level, the larger the width of a clearance from an object is set.

Figure 6C:
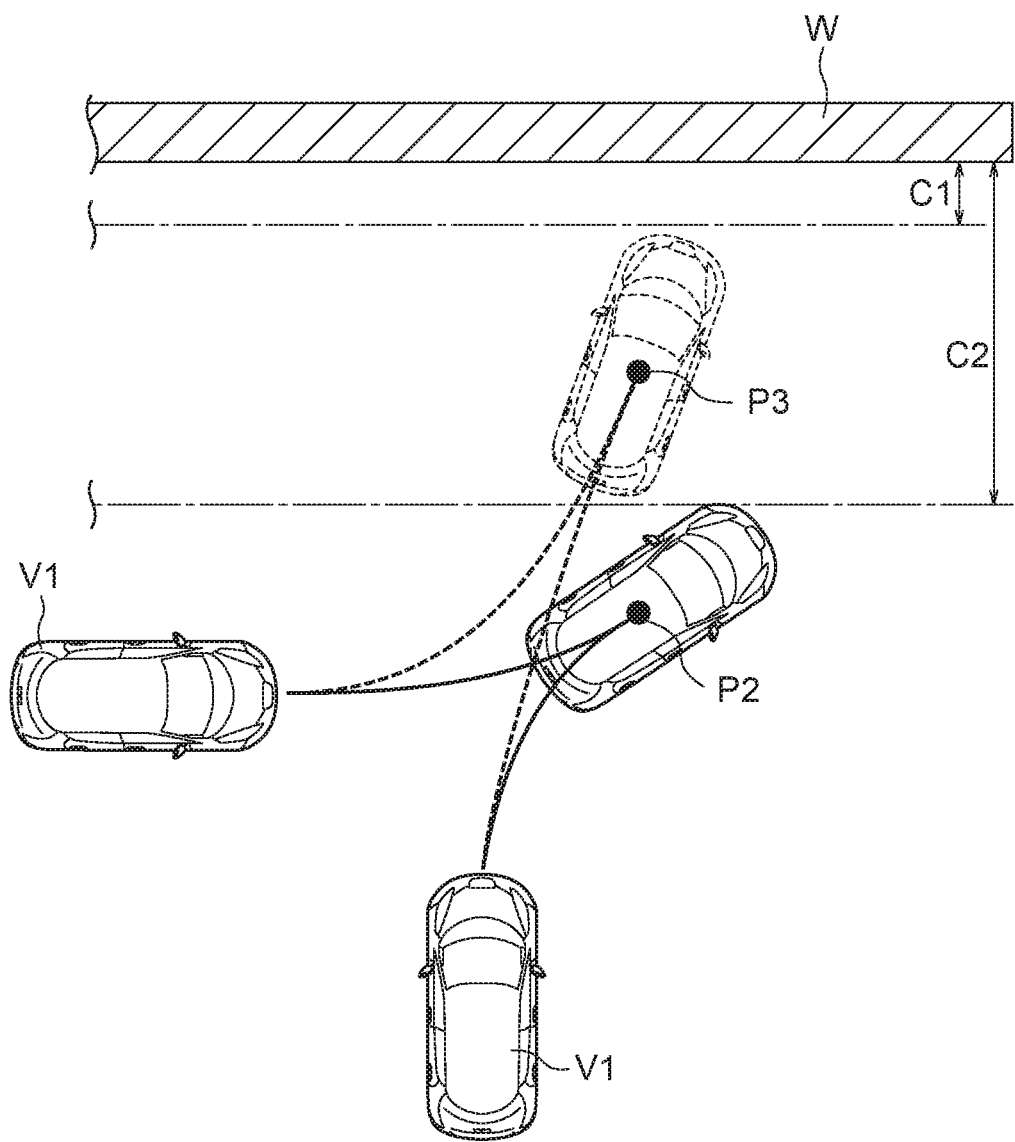
FIG. 6C is a diagram illustrating a third calculation example of a parking route.

This will be described with reference to FIG. 6C. As illustrated in the figure, a case will be discussed in which the vehicle V1 starts from a position P1, once turns at a position P2 or a position P3 for parking, and parks to a position P4. A wall W as an object is present on the left front side of the position P2, P3 at which the turn for parking is performed.

When the communication environment is good, the first parameter is used to generate the parking route which follows the position P1, the position P3, and the position P4 and with which the width (length) of the clearance from the wall is C1. On the other hand, when the communication environment is bad, the second or third parameter is used to generate the parking route which follows the position P1, the position P2, and the position P4 and with which the width of the clearance from the wall W is C2 (C2>C1). The lower the communication environment level, the larger the width of the clearance from the wall W as an object is set.

Thus, the parking route is generated so that the width of a clearance from an object is larger as the level of the communication environment is lower. This allows the operation of turn for parking to be performed at a position away from the object (e.g. the wall W). When the level of the communication environment is low, by taking a sufficient distance between the vehicle V1 and the wall W, it is possible to ensure the movable region for the vehicle V1 and secure the degree of freedom in the movement of the vehicle V1.

The above-described level of the communication environment may be determined for the entire region around the vehicle V1, or the region around the vehicle V1 may be divided into a plurality of regions and the determination may be performed for each region. Further, the above-described parameters may be applied to the entire region around the vehicle V1, or the region around the vehicle V1 may be divided into a plurality of regions and the parameters may be applied to each region.

The control device 10 may set a plurality of regions in accordance with the level of the communication environment. The control device 10 recognizes spaces having different communication environment levels as different regions. The control device 10 acquires a parameter corresponding to the communication environment of each region, calculates the parking route in each region using the parameter, and calculates the entire parking route from the parking route in each region.

Figure 7:
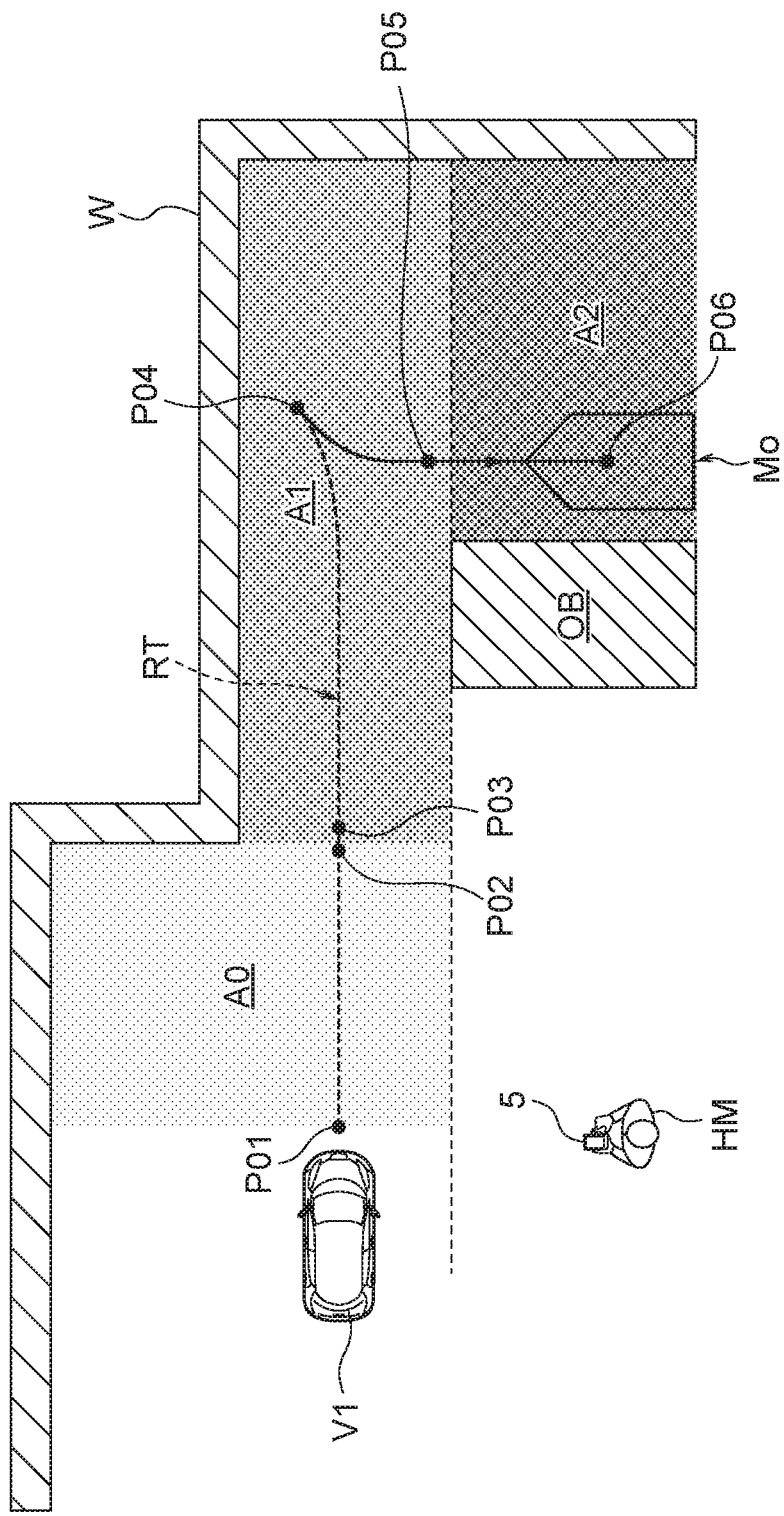
FIG. 7 is a diagram for describing a processing example in which a different parameter is applied to a region of different communication environment.

As illustrated in FIG. 7, the control device 10 evaluates the communication environment of a space around the vehicle V1 for each region. Spaces around the vehicle V1 are defined by a wall W and have an object OB that is a structure. The vehicle V1 is parked into a target parking space Mo. When calculating a parking route RT for the vehicle V1, the control device 10 applies different parameters to regions A0, A1, and A2. The communication environment of the region A0 is in level 1 (normal). The parameter of the route from P01 to P02 in the parking route RT is the first parameter. The communication environment of the region A1 is in level 2 (bad). The parameter of the route from PO3 to the position of turn for parking PO4 and the route from PO4 to PO5 in the parking route RT is the second parameter. The communication environment of the region A2 is in level 3 (very bad). The parameter of the route from P05 to P06 as the stop position in the parking route RT is the third parameter.

Objects such as structures and other vehicles are present around the vehicle V1, so the communication environment is not uniform. For each of the plurality of regions corresponding to the levels of the communication environment, the parking route in each region is calculated using the parameter corresponding to the level of the communication environment. This allows the parking route corresponding to the communication environment to be calculated even when the communication environment is different in each region.

The parameter applied to each section is not limited to a parameter related to generation of the parking route, and the parameter for controlling the movement of the vehicle V1 can also be applied to each section.

The control device 10 sets a plurality of regions corresponding to the levels of the communication environment and calculates a parking route that does not pass through a region in which the level of the communication environment is evaluated to be low.

As illustrated in FIG. 8, a case will be discussed in which the vehicle V1 is parked into a target parking space Mo. When the communication environment of the entire space around the vehicle V1 is good, the parking route for the vehicle V1 is a route in which the vehicle V1 makes a stop at a position P3, changes the shift, and moves back to reach the target parking space Mo. As illustrated in the figure, the region A2 including the position P3 at which the turn for parking (temporary stop, shift change, steering) is performed is surrounded by a wall W, and the communication environment is in level 3 (very bad). In such a case, the control device 10 calculates a parking route that does not pass through the region A2 in which the communication environment is very bad. Specifically, the control device 10 calculates a route in which the vehicle V1 turns for parking at a position P2 (outside the region A2) to reach the target parking space Mo.

The parking route is calculated so as not to pass through a region in which the level of the communication environment is evaluated to be low, and it is therefore possible to prevent a situation in which the operation of parking the vehicle V1 cannot be performed due to the disruption of communication in mid-course.

Referring again to FIG. 2, in step 108, the control device 10 uses the acquired parameters to calculate a route for the vehicle V1 to move to the target parking space Mo.

In step 109, the control device 10 calculates control information when moving the vehicle V1 to the target parking space Mo. First, the control device 10 acquires parameters used when calculating the control information. The parameters are set for each communication environment level. The control device 10 reads the parameters corresponding to the level of the communication environment evaluated in step 106. FIG. 9 illustrates an example of the parameters used for calculation of the control information.

The parameters used for calculation of the control information include any one or more of the speed, upper limit speed, acceleration, deceleration, yaw rate, lateral acceleration, steering amount, steering speed, deceleration for stopping, and deceleration time for stopping which relate to the movement of the vehicle V1.

Each parameter is set for each communication environment level. A first parameter is set for a communication environment level 1 (normal), a second parameter is set for a communication environment level 2 (relatively worse than the communication environment level 1), and a third parameter is set for a communication environment level 3 (relatively worse than the communication environment level 2, i.e., very bad). In this example, the communication environment levels and the parameters are classified into three stages, but the number of stages is not limited.

By calculating the control information using a parameter corresponding to the level of the communication environment, even when the communication environment is bad, the vehicle V1 can be parked with the control content adapted to the communication environment.

In one or more embodiments of the present invention, the following schemes are proposed as those for calculating the control information corresponding to the communication environment.

(1) When the level of the communication environment is evaluated to be low, the control device 10 changes the speed or acceleration of the vehicle V1 to a lower value than when the level of the communication environment is not evaluated to be low, and controls the vehicle V1 on the basis of the changed speed or acceleration. As illustrated in FIG. 9, for the speed, a first parameter VR1, a second parameter VR2, and a third parameter VR3 are set (VR1>VR2>VR3). For the acceleration, a first parameter AR1, a second parameter AR2, and a third parameter AR3 are set (AR1>AR2>AR3). As illustrated in the figure, the lower the communication environment level, the lower the speed or acceleration is set.

When the communication environment is bad, by reducing the speed/acceleration of the vehicle V1, it is possible to suppress the deceleration behavior which occurs when the communication disruption occurs. If the vehicle speed or acceleration of the vehicle V1 is increased when the communication environment is bad, there is a possibility that the operation command cannot be received and the operation command cannot be rapidly executed. In this case, even though the operator inputs the operation command, the vehicle V1 may not execute the operation command, which gives uncomfortable feeling to the operator.

The scheme of calculating the speed, acceleration, deceleration, upper limit speed, and upper limit acceleration of the vehicle V1 when moving along the parking route is not particularly limited, and any scheme known at the time of filing of this application can be used. Although not particularly limited, it is preferable to calculate the speed, acceleration, deceleration, upper limit speed, upper limit acceleration, steering speed, and lateral acceleration so that the influence of the yaw rate of the vehicle V1 on the vehicle V1 is minimized.

(2) When the level of the communication environment is evaluated to be low, the control device 10 sets the upper limit speed or upper limit acceleration of the vehicle V1 to a lower value than when the level of the communication environment is not evaluated to be low, and controls the vehicle V1 on the basis of the upper limit speed or upper limit acceleration. As illustrated in FIG. 9, for the upper limit speed, a first parameter UVR1, a second parameter UVR2, and a third parameter UVR3 are set (UVR1>UVR2>UVR3). For the upper limit acceleration, a first parameter UAR1, a second parameter UAR2, and a third parameter UAR3 are set (UAR1>UAR2>UAR3). As illustrated in the figure, the lower the communication environment level, the lower the upper limit speed or upper limit acceleration is set.

When the communication environment is bad, by lowering the upper limit speed/upper limit acceleration of the vehicle V1, it is possible to suppress the occurrence of the deceleration behavior caused when the communication disruption occurs and also to suppress the magnitude of the behavior. Moreover, by suppressing the upper limit speed/upper limit acceleration of the vehicle V1 to a lower value, the operation command can be easily received even when the communication environment is bad.

(3) When the level of the communication environment is evaluated to be low, the control device 10 sets any one or more of the parameters including the yaw rate, lateral acceleration, steering amount, steering speed, and deceleration of the vehicle V1 than when the level of the communication environment is not evaluated to be low. As illustrated in FIG. 9, for the yaw rate, a first parameter YR1, a second parameter YR2, and a third parameter YR3 are set (YR1>YR2>YR3). For the lateral acceleration, a first parameter HAR1, a second parameter HAR2, and a third parameter HAR3 are set (HAR1>HAR2>HAR3). As illustrated in the figure, the lower the communication environment level, the lower the upper limit speed or upper limit acceleration is set. The same applies to the lateral acceleration HAR1 and the steering amount STR1.

When the communication environment is bad, by reducing the parameters including the yaw rate, lateral acceleration, steering amount, steering speed, and deceleration of the vehicle V1, the magnitude of the behavior caused when the communication disruption occurs can be reduced.

(4) When the level of the communication environment is evaluated to be low, the control apparatus 10 sets the deceleration time for stopping from the start of deceleration of the vehicle V1 to the stop at the target parking space Mo to a longer time than when the level of the communication environment is not evaluated to be low, and controls the vehicle V1 to start the deceleration from the deceleration start time and park into the target parking space Mo. The vehicle V1 starts the deceleration from the deceleration start point and stops at the target parking space Mo. Setting the deceleration time for stopping the vehicle V1 from the deceleration start time to the stop at the target parking space Mo to a long time is to shift the deceleration start point in the parking route to the upstream side (the start point side of the parking route). As illustrated in FIG. 9, for the deceleration time for stopping, a first parameter STRP1, a second parameter STRP2, and a third parameter STRP3 are set (STRP1<STRP2<STRP3).

The controller 10 sets the deceleration time for stopping to a longer time as the communication environment gets worse and the vehicle V1 can thereby be controlled to start the deceleration early and stop at the target parking space without sudden deceleration.

When the control device 10 sets a plurality of regions in accordance with the level of the communication environment, the control device 10 acquires a parameter corresponding to the communication environment of each region and calculates the control information for each region using the parameter. By calculating the control information for each region, the vehicle V1 can be appropriately controlled in accordance with the communication environment of the region, thus achieving the efficient movement of the vehicle V1 and the reduced parking operation time.

As in the previously-described example illustrated in FIG. 7, when a plurality of regions is recognized, a parameter for generating the control information for each region is acquired. When obtaining the control information for the vehicle V1 to move along the parking route RT, the control device 10 applies different parameters to regions A0, A1, and A2. In the figure, the communication environment of the region A0 is in level 1 (normal). The parameter of the route from P01 to P02 in the parking route RT is the first parameter. The communication environment of the region A1 is in level 2 (bad). The parameter of the route from P03 to the position of turn for parking PO4 and the route from PO4 to P05 in the parking route RT is the second parameter. The communication environment of the region A2 is in level 3 (very bad). The parameter of the route from P05 to P06 as the stop position in the parking route RT is the third parameter.

The communication environment is not uniform; therefore, the communication environment is evaluated for each region and the control information in each region is calculated using the parameter corresponding to the level of the communication environment. This allows the control information corresponding to the communication environment to be calculated even when the communication environment is different in each region.

As previously described, the level of the communication environment can be evaluated in accordance with the communication disruption time. The control device 10 can determine that the level of the communication environment is lower as the communication disruption time is longer. The control device 10 can set the value of a parameter for calculating the control information in accordance with the length of the disruption time. For example, as the communication disruption time is longer, the control device 10 can set the speed, acceleration, deceleration, upper limit speed, upper limit acceleration, yaw rate, lateral acceleration, steering amount, and steering speed to larger values in accordance with the length of the communication disruption time. In addition or alternatively, as the communication disruption time is longer, the deceleration time for stopping from the start of deceleration to the stop position can be prolonged.

In one or more embodiments of the present invention, when the communication environment around the vehicle V1 is bad, the behavior (such as the speed or acceleration) of the vehicle V1 is suppressed from being emphasized and, therefore, even if the vehicle V1 is stopped in an emergency due to the communication disruption, the vehicle V1 can be controlled so as not to exhibit an emphasized behavior.

When an execution instruction for the parking control process is input in step 110, the routine proceeds to step 111 in which the parking control apparatus 100 according to one or more embodiments of the present invention executes the parking control process.

The parking control apparatus 100 according to one or more embodiments of the present invention controls the operation of the drive system 40 via the vehicle controller 30 so that the vehicle V1 moves along the parking route in accordance with the control information.

The parking control apparatus 100 calculates command signals to the drive system 40 of the vehicle V1, such as an EPS motor, while feeding back the output value of the steering angle sensor 50 of the steering apparatus so that the travel trajectory of the vehicle V1 coincides with the calculated parking route, and transmits the command signals to the drive system 40 or to the vehicle controller 70 which controls the drive system 40.

The parking control apparatus 100 according to one or more embodiments of the present invention includes a parking control unit. The parking control unit acquires shift range information from an AT/CVT control unit, wheel speed information from an ABS control unit, steering angle information from a steering angle control unit, engine speed information from an ECM, and other necessary information. On the basis thereof, the parking control unit calculates and outputs instruction information on the automated steering to the EPS control unit, instruction information such as warning to a meter control unit, etc. The control device 10 acquires information items, which are acquired by the steering angle sensor 50 of the steering apparatus of the vehicle V1 and the vehicle speed sensor 60 and other sensors of the vehicle, via the vehicle controller 70.

The drive system 40 according to one or more embodiments of the present invention controls the vehicle V1 to move (travel) from the current position to the target parking space Mo by driving based on the control command signals acquired from the parking control apparatus 100. The steering apparatus according to one or more embodiments of the present invention is a drive mechanism that moves the vehicle V1 in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V1 to the target parking space Mo. The control content and operation scheme for parking of the vehicle V1 are not particularly limited, and any scheme known at the time of filing of this application can be appropriately applied.

When the parking control apparatus 100 according to one or more embodiments of the present invention controls the vehicle V1 to move to the target parking space Mo along the route calculated based on the position P4 of the vehicle V1 and the position of the target parking space Mo, the accelerator and the brake are automatically controlled on the basis of the specified control vehicle speed (set vehicle speed), and the operation of the steering apparatus is also automatically controlled in accordance with the vehicle speed. That is, during the parking control according to one or more embodiments of the present invention, the steering operation and the accelerator/brake operation are automatically performed. Furthermore, the parking control apparatus 100 according to one or more embodiments of the present invention is also applicable to manual parking in which the driver performs the operation of the accelerator, brake, and steering.

The parking control apparatus 100 according to one or more embodiments of the present invention is capable of a remote control parking process in which the vehicle V1 with no driver is parked by transmitting a setting command for the target parking space Mo, a parking process start command, a parking suspension/cancellation command, etc. to the vehicle V1 from the outside.

Simulation was conducted to confirm the effects of one or more embodiments of the present invention. In this simulation, profiles of the behavior (such as speed) of the vehicle V1 were obtained using different parameters in accordance with the level of the communication environment. Results of the simulation will be described with reference to FIG. 10, FIG. 11A, and FIG. 11B.

Figure 10:
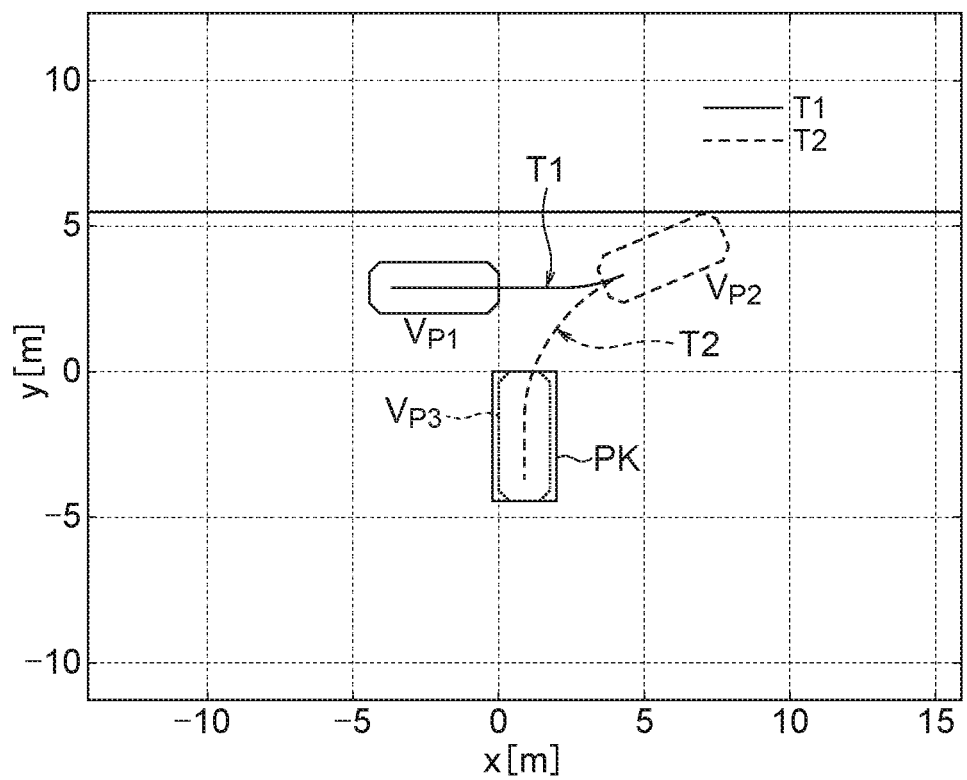
FIG. 10 is a diagram for describing conditions of a simulation according to one or more embodiments of the present invention.

FIG. 10 is a diagram for describing conditions of the simulation. The vehicle as a model starts from a first position VP1 and moves along a first route T1 to a second position VP2. The vehicle then turns back at the second position VP2 and moves along a second route T2 to a third position VP3. The third position VP3 is a target position PK at which the vehicle V1 stops. Simulation was conducted under the same conditions when the communication environment is normal and when the communication environment is bad. In the simulation, the conditions are set as the lane width: lane width [m], the parking space width: spot width [m], the vehicle width: lat. [m], the parking start angle: init. [deg.], and the parking completion angle: fin [deg.]. These conditions determine acceptable routes and operations. An optimum route (a route with which parking can be performed in the minimum time or a route with which the behavior is suppressed) is generated from among the acceptable routes and operations, and the simulation is executed.

Figure 11A:
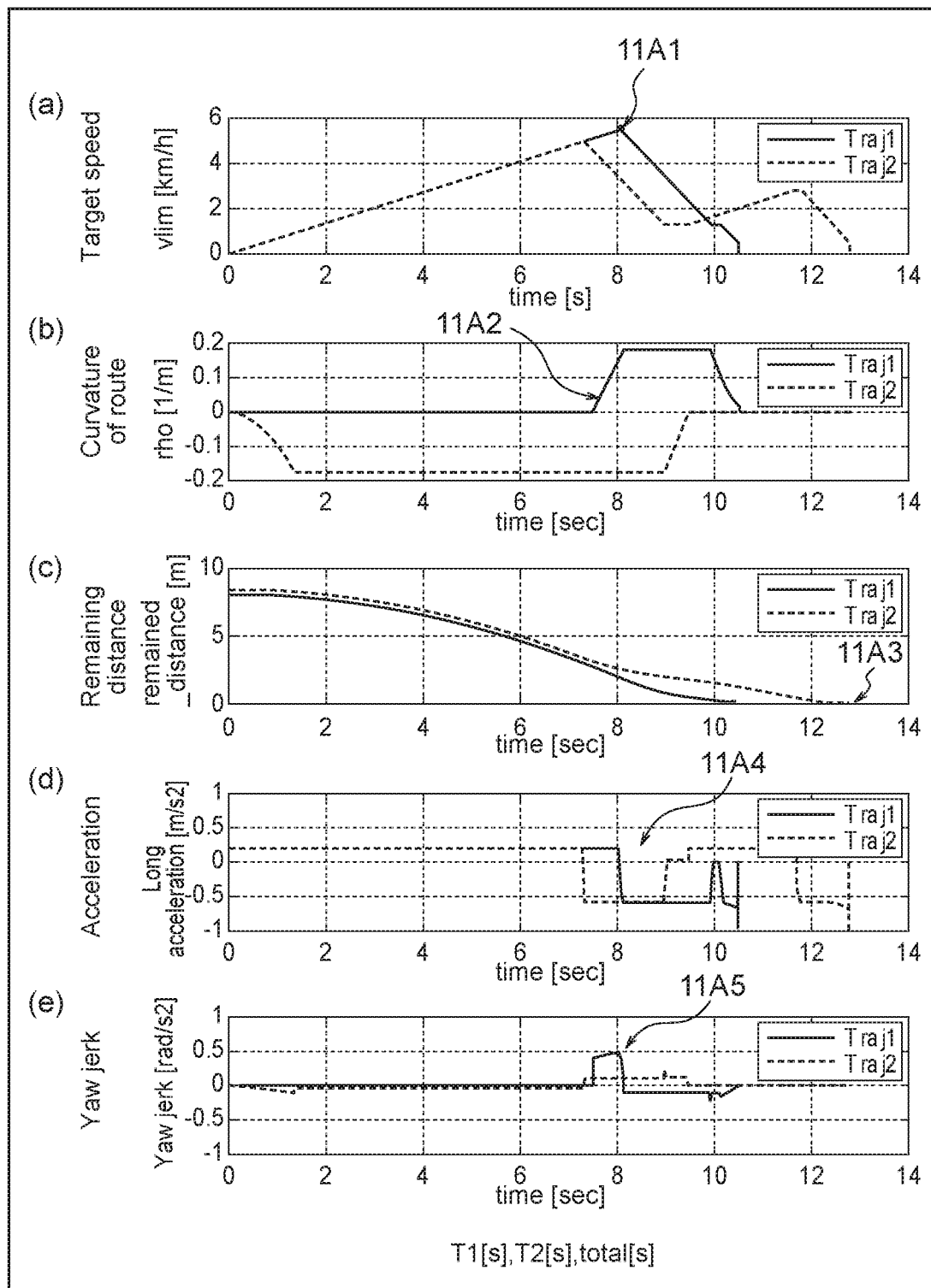
FIG. 11A is a set of graphs (a) to (e) each illustrating the profile of a behavior of the vehicle when the communication environment is normal.
Figure 11B:
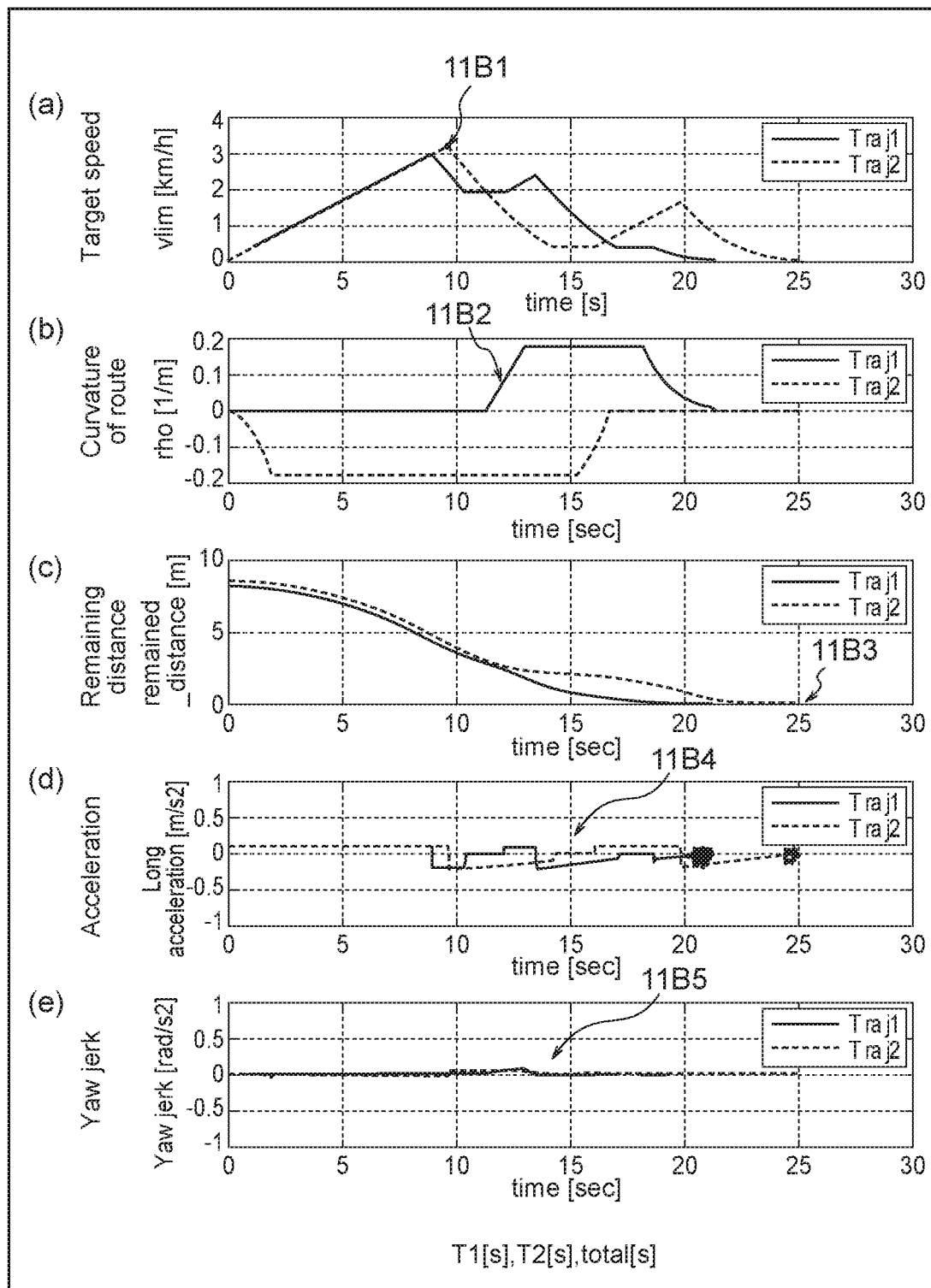
FIG. 11B is a set of graphs (a) to (e) each illustrating the profile of a behavior of the vehicle when the communication environment is bad.

FIG. 11A illustrates changes over time in the target speed (a), the curvature of route (b), the remaining distance (c), the acceleration (d), and the yaw jerk (e) when the communication environment is normal (relatively better). FIG. 11B illustrates changes over time in the target speed (a), the curvature of route (b), the remaining distance (c), the acceleration (d), and the yaw jerk (e) when the communication environment is bad (relatively worse). In both FIG. 11A and FIG. 11B, Traj1 in the figure represents a profile for the first route T1 and Traj2 represents a profile for the second route T2.

Comparison will be made between the profiles of FIG. 11A and FIG. 11B.

(1) The maximum value 11B1 of the target speed of the profile when the communication environment is relatively worse as illustrated in FIG. 11B(a) is controlled to be lower than the maximum value 11A1 of the target speed of the profile when the communication environment is relatively better as illustrated in FIG. 11A(a). When the communication environment is relatively worse, the maximum value of the target speed can be relatively reduced thereby to suppress the behavior of the vehicle upon the communication disruption.

(2) The curvature change rate 11B2 of the profile when the communication environment is relatively worse as illustrated in FIG. 11B(b) is controlled to be lower than the curvature change rate 11A2 of the profile when the communication environment is relatively better as illustrated in FIG. 11A(b). When the communication environment is relatively worse, the curvature change rate can be relatively reduced thereby to suppress the behavior of the vehicle upon the communication disruption.

(3) The time 11B3 until the remaining distance of the profile when the communication environment is relatively worse comes to zero (parking completion) as illustrated in FIG. 11B (c) is controlled to be longer than the time 11A3 until the remaining distance of the profile when the communication environment is relatively better comes to zero (parking completion) as illustrated in FIG. 11A(c). When the communication environment is relatively worse, the parking operation time can be prolonged so that the change in the behavior of the vehicle V1 is relatively small, thereby to suppress the behavior of the vehicle upon the communication disruption.

(4) The variation width of the acceleration 11B4 of the profile when the communication environment is relatively worse as illustrated in FIG. 11B(d) is controlled to be smaller than the variation width of the acceleration 11A4 of the profile when the communication environment is relatively better as illustrated in FIG. 11A(d). When the communication environment is relatively worse, the variation width of the acceleration can be relatively reduced thereby to suppress the behavior of the vehicle upon the communication disruption.

(5) The maximum value/variation width 11B5 of the yaw jerk of the profile when the communication environment is relatively worse as illustrated in FIG. 11B(e) is controlled to be smaller than the maximum value/variation amount 11A5 of the yaw jerk of the profile when the communication environment is relatively better as illustrated in FIG. 11A(e). When the communication environment is relatively worse, the maximum value/variation amount of the yaw jerk can be relatively reduced thereby to suppress the behavior of the vehicle upon the communication disruption.

The parking control method according to one or more embodiments of the present invention is used in the parking control apparatus as the above and therefore has the following effects. The parking control apparatus 100 according to one or more embodiments of the present invention is configured and operates as the above and therefore has the following effects.

(1) According to the parking control method in one or more embodiments of the present invention, the vehicle V1 is controlled to park into the target parking space with the control content in accordance with the result of evaluation of the communication environment around the vehicle V1 and, therefore, even in a location in which satisfactory communication cannot be performed due to the environment around the vehicle V1, presence of an object, lack of communication infrastructure, disturbance, etc., the vehicle V1 can be parked by a method adapted to the communication environment.

(2) According to the parking control method in one or more embodiments of the present invention, when the communication environment is evaluated to be bad, the time required for parking operation is prolonged than when the communication environment is not evaluated to be bad. Through this operation, even in a location in which satisfactory communication cannot be performed due to the environment around the vehicle V1, presence of an object, lack of communication infrastructure, disturbance, etc., the time required for parking operation is prolonged and the vehicle V1 can be parked by a method adapted to the communication environment.

Moreover, according to the parking control method in one or more embodiments of the present invention, the time required for parking operation is prolonged thereby to suppress the amount of change in the relative positional relationship between the vehicle V1 and the input terminal device 5; therefore, the reception status of the operation command for the vehicle V1 is stabilized and the operation command can readily be received.

(3) According to the method in one or more embodiments of the present invention, the control information can be calculated using a parameter corresponding to the level of the communication environment. Even when the communication environment is bad, the vehicle V1 can be parked with the control content adapted to the communication environment. In one or more embodiments of the present invention, when the communication environment around the vehicle V1 is bad, the behavior (such as the speed or acceleration) of the vehicle V1 is suppressed from being emphasized and, therefore, even if the vehicle V1 is stopped in an emergency due to the communication disruption, the vehicle V1 can be controlled so as not to exhibit an emphasized behavior.

(4) According to the method in one or more embodiments of the present invention, when the communication environment is bad, the speed/acceleration of the vehicle V1 can be lowered thereby to suppress the deceleration behavior caused upon the occurrence of communication disruption. Moreover, the speed/acceleration can be lowered thereby to suppress the increase in the movement amount of the vehicle when the communication is disrupted.

(5) According to the method in one or more embodiments of the present invention, when the communication environment is bad, the upper limit speed/upper limit acceleration of the vehicle V1 can be lowered thereby to suppress the deceleration behavior caused upon the occurrence of communication disruption. By suppressing the upper limit speed/upper limit acceleration of the vehicle V1 to a lower value, the operation command can readily be received even when the communication environment is bad.

(6) According to the method in one or more embodiments of the present invention, the deceleration time for stopping is set longer as the communication environment gets worse, and the vehicle V1 can thereby be controlled to start the deceleration early and stop at the target parking space without sudden deceleration.

(7) According to the method in one or more embodiments of the present invention, the parking route can be calculated using a parameter corresponding to the level of the communication environment thereby to park the vehicle with the route adapted to the communication environment even when the communication environment is bad. When the communication environment is bad, by calculating a different parking route using a different parameter, the communication environment can be maintained or improved.

(8) According to the method in one or more embodiments of the present invention, a parking route having a shorter path length is generated as the level of the communication environment is lower and it is possible to reduce the risk of occurrence of communication disruption when moving along the parking route.

(9) According to the method in one or more embodiments of the present invention, by generating a parking route having a shorter distance from the start point of the parking route to the position of turn for parking (position at which shift change is performed) as the level of the communication environment is lower, the operation of turn for parking (operation of moving back after making a stop) can be performed at a point nearer to the input terminal device 5 or the user. This results in a shortened parking route and it is therefore possible to reduce the risk of occurrence of communication disruption when moving along the parking route.

(10) According to the method in one or more embodiments of the present invention, the parking route is generated so that the width of a clearance from an object is larger as the level of the communication environment is lower. This allows the operation of turn for parking (operation of moving back after making a stop) to be performed at a position away from the object (e.g. a wall W). When the level of the communication environment is low, by taking a sufficient distance between the vehicle V1 and the wall W, it is possible to ensure the movable region for the vehicle V1 and secure the degree of freedom in the movement of the vehicle V1.

(11) Objects such as structures and other vehicles are present around the vehicle, so the communication environment is not uniform. According to the method in one or more embodiments of the present invention, for each of a plurality of regions corresponding to the levels of the communication environment, the parking route in each region is calculated using a parameter corresponding to the level of the communication environment. This allows the parking route corresponding to the communication environment to be calculated even when the communication environment is different in each region.

(12) According to the method in one or more embodiments of the present invention, the parking route is calculated so as not to pass through a region in which the level of the communication environment is low and, therefore, even when a region in which the level of the communication environment is low is present, automated parking control can be executed by remote control. In other words, it is possible to prevent a situation in which the operation of parking the vehicle V1 cannot be performed due to the disruption of communication in mid-course.

(13) According to the method in one or more embodiments of the present invention, when the level of the communication environment is evaluated to be low, the frequency at which the operation command is transmitted and received is changed. By changing the frequency, the communication environment can be improved.

(14) According to the method in one or more embodiments of the present invention, upon evaluation of the communication environment around the vehicle V1, the level of the communication environment is evaluated in accordance with the positional relationship (e.g. the distance and direction) between the vehicle V1 and the input terminal device 5 which transmits an operation command, and it is thereby possible to properly evaluate the communication environment when the remote parking process is performed using the input terminal device 5.

(15) According to the method in one or more embodiments of the present invention, upon evaluation of the communication environment around the vehicle V1, objects around the vehicle V1 are detected, the level of the communication environment is evaluated in accordance with the detection results of the objects, and it is thereby possible to properly evaluate the communication environment when the remote parking process is performed using the input terminal device 5.

(16) According to the method in one or more embodiments of the present invention, upon evaluation of the communication environment around the vehicle V1, the level of the communication environment is evaluated to be lower as the distance between the input terminal device 5 and an object is shorter or as the distance between the vehicle 1 and an object is shorter, and it is thereby possible to properly evaluate the communication environment when the remote parking process is performed, with consideration for the disturbance of multipath interference by the object.

(17) According to the method in one or more embodiments of the present invention, by referring to the communication environment information 131 which is preliminarily associated with the positional information and evaluating the communication environment around the vehicle V1 on the basis of the communication environment information around the vehicle V1, the communication environment can be evaluated with consideration for the status (attribute) of each point and the fact that the communication disruption occurred in past times.

(18) According to the method in one or more embodiments of the present invention, when evaluating the communication environment around the vehicle V1, the level of the communication environment is evaluated in accordance with the unoccupied situation of a band of the communication radio wave used around the vehicle V1 and, therefore, the communication environment can be accurately evaluated on the basis of the actual communication situation.

(19) According to the method in one or more embodiments of the present invention, the level of the communication environment is evaluated on the basis of the disruption state of communication around the vehicle V1 and it is thereby possible to evaluate the communication environment on the basis of the actual situation.

(20) According to the method in one or more embodiments of the present invention, when the level of the communication environment is evaluated to be low, by varying the evaluation threshold for evaluating the disruption state so that the occurrence of communication disruption is more likely to be determined, the occurrence of the communication disruption can be determined with a high degree of accuracy. This can appropriately respond to the communication disruption and it is thus possible to prevent the occurrence of deceleration due to the occurrence of communication disruption.

(21) The above-described parking control method/method of displaying parking information can be carried out using the parking control apparatus 100 according to one or more embodiments of the present invention. The parking control apparatus 100 according to one or more embodiments of the present invention therefore has the above-described actions and effects.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

| 1000 | Parking control system |
| 100 | Parking control apparatus |
| 10 | Control device |
| 11 | CPU |
| 12 | ROM |
| 13 | RAM |
| 20 | Input device |
| 21 | Communication device |
| 30 | Output device |
| 31 | Display |

| | |
|---|---|
| 1a-1d | Cameras |
| 2 | Image processing device |
| 3 | Ranging device |
| 5 | Input terminal device |
| 200 | Onboard device |
| | 40 Drive system |
| | 50 Steering angle sensor |
| | 60 Vehicle speed sensor |
| 70 | Vehicle controller |
| V1 | Vehicle |
| V2, V3 | Another vehicle |

The invention claimed is:

1. A parking control method for controlling a vehicle on a basis of an operation command related to parking control acquired from outside of the vehicle, the parking control method, comprising:
evaluating, with a control device, around the vehicle, a level of a communication environment of a communication signal between the control device and the input terminal device to transmit the operation command from the input terminal device that is related to the parking control of the vehicle, prior to receiving the communication signal that includes the operational command to execute the parking control, the input terminal device spaced a distance from the vehicle, wherein the step of evaluating the level of the communication environment comprises:
determining a directional position and distance position of the input terminal device relative to an antenna of the vehicle or a position of one or more objects relative to the input terminal device and the vehicle;
determining whether an interference in the communication signal has occurred from the directional position and the distance position of the input terminal device relative to the antenna of the vehicle or the position of the one or more objects relative to the input terminal device and the vehicle interfering with the communication signal between the control device and the input terminal device; and
determining the level of the communication environment is low when an interference has occurred or is not low when an interference has not occurred;
calculating, with the control device, a parameter that guides the vehicle into a target parking space in accordance with the level of the communication environment;
transmitting, from the input terminal device to the vehicle, the operation command to execute parking the vehicle after the parameter is calculated; and
controlling, with the control device, the vehicle to park in a target parking space based on the parameter.

2. The parking control method according to claim 1, wherein evaluating, around the vehicle, the level of the communication environment includes:
calculating control information for the vehicle in accordance with the level of the communication environment; and
controlling the vehicle to park on a basis of the control information.

3. The parking control method according to claim 2, wherein the control information includes a speed or acceleration of the vehicle,
when the level of the communication environment is evaluated to be low, the speed or acceleration of the vehicle is set lower than when the level of the communication environment is not evaluated to be low, and
the vehicle is controlled to park on a basis of the set speed or acceleration.

4. The parking control method according to claim 2, wherein the control information includes an upper limit speed or upper limit acceleration of the vehicle,
when the level of the communication environment is evaluated to be low, the upper limit speed or upper limit acceleration of the vehicle is set lower than when the level of the communication environment is not evaluated to be low, and
the vehicle is controlled to park on a basis of the upper limit speed or upper limit acceleration.

5. The parking control method according to claim 2, wherein the control information includes a deceleration time for stopping from start of deceleration to stop of the vehicle,
when the level of the communication environment is evaluated to be low, the deceleration time for stopping is set longer than when the level of the communication environment is not evaluated to be low, and
the vehicle is parked by starting deceleration from the start of deceleration.

6. The parking control method according to claim 1, wherein evaluating, around the vehicle, the level of the communication environment includes:
calculating a parking route in accordance with the level of the communication environment; and
parking the vehicle on a basis of the parking route.

7. The parking control method according to claim 6, wherein when the level of the communication environment is evaluated to be low,
the parking route is calculated to be shorter than when the level of the communication environment is not evaluated to be low, and
the vehicle is controlled on a basis of the parking route.

8. The parking control method according to claim 6, wherein when the level of the communication environment is evaluated to be low,
the parking route is calculated in which a position of turn for parking is shifted to an upstream side than when the level of the communication environment is not evaluated to be low, and
the vehicle is parked on a basis of the parking route.

9. The parking control method according to claim 6, calculating the parameter that guides the vehicle into the target parking space in accordance with the level of the communication environment includes:
when the level of the communication environment is evaluated to be low, calculating the parking route under a condition in which a width of clearance from the object is extended than when the level of the communication environment is not evaluated to be low.

10. The parking control method according to claim 6, comprising:
setting a plurality of regions in accordance with the level of the communication environment;
calculating parking routes in the regions;
calculating the entire parking route from the parking routes of the regions; and
parking the vehicle on a basis of the calculated parking route.

11. The parking control method according to claim 6, comprising:
setting a region in accordance with the level of the communication environment;

calculating the parking route which does not pass through the region in which the level of the communication environment is evaluated to be low; and parking the vehicle on a basis of the calculated parking route.

12. The parking control method according to claim 1, wherein when the level of the communication environment is evaluated to be low, a frequency at which the operation command is transmitted and received is changed.

13. The parking control method according to claim 1, wherein evaluating the level of the communication environment around the vehicle includes:

monitoring a distance between the input terminal device and an antenna through free space propagation;

monitoring an angle of radio wave communication direction of the input terminal device and the antenna relative to the traveling direction of the vehicle; and determining an interference of the communication signal by:

determining that the distance between input terminal device and the antenna is longer; and/or determining that a body portion of the vehicle interferes with the communication signal between the input terminal device and the antenna.

14. The parking control method according to claim 1, wherein evaluating the level of the communication environment around the vehicle includes:

detecting the one or more objects around the vehicle;

monitoring positions, sizes, or number of the one or more objects relative to the input terminal device and the vehicle; and determining an interference of the communication signal by:

estimating free space propagation loss due to the presence of the one or more objects between the vehicle and the input terminal device;

estimating multipath interference as the size of the one or more objects in the vicinity of the input terminal device and/or the vehicle are larger; and/or estimating multipath interference as the number of the one or more objects in the vicinity of the input terminal device and the vehicle are larger.

15. The parking control method according to claim 1, wherein evaluating the level of the communication environment around the vehicle includes:

detecting, with the control device, an object having a distance around the vehicle and the input terminal device having a distance around the vehicle;

determining a distance between the input terminal device and the object based on the distance of the object around the vehicle and the distance of the input terminal device around the vehicle; and determining, with the control device, an interference of the communication signal as the distance between the object and the input terminal device is shorter or the distance between the vehicle and the object is shorter.

16. The parking control method according to claim 1, wherein evaluating the level of the communication environment around the vehicle includes:

referring to communication environment information that is preliminarily associated with positional information; and evaluating the level of the communication environment around the vehicle on a basis of the communication environment information around the vehicle.

17. A parking control method for controlling a vehicle on a basis of an operation command related to parking control acquired from outside of the vehicle, the parking control method, comprising:

evaluating, with a control device, around the vehicle, a level of a communication environment of a communication signal to transmit the operation command from an input terminal device that is related to the parking control to the vehicle prior to receiving the communication signal that includes the operational command to execute the parking control, the input terminal device spaced a distance from the vehicle, wherein the step of evaluating the level of the communication environment comprises:

evaluating the level of the communication environment in accordance with an unoccupied situation of a frequency band of a communication radio wave used around the vehicle; or evaluating the level of the communication environment on a basis of a disruption state of communication around the vehicle, wherein the disruption state of the communication signal is a number of occurrences of interference of the communication signal per unit of time;

calculating, with the control device, a parameter that guides the vehicle into a target parking space in accordance with the level of the communication environment;

transmitting, from the input terminal device to the vehicle, the operation command to execute parking the vehicle after the parameter is calculated; and controlling, with the control device, the vehicle to park in a target parking space based on the parameter.

18. A parking control apparatus, comprising:

an input device configured to acquire an operation command related to parking control from outside of a vehicle and transmit the operation command to the control device; and a control device configured to control the vehicle to park into a target parking space in accordance with the operation command, the control device being configured to:

evaluate, around the vehicle, a level of a communication environment of a communication signal between the control device and the input terminal device for transmitting the operation command from the input device that is related to the parking control to the vehicle, the communication signal comprising the operation command;

determine a directional position and distance position of the input terminal device relative to an antenna of the vehicle or a position of one or more objects relative to the input terminal device and the vehicle;

determine whether an interference in the communication signal has occurred from the directional position and the distance position or the position of the one or more objects relative to the input terminal device and the vehicle interfering with the communication signal between the control device and the input terminal device;

calculate a parameter relating to control of the vehicle that is used for performing the parking control in accordance with the level of the communication environment;

receive, from the input device to the control device, the operation command to execute parking the vehicle after the parameter is calculated; and control the vehicle to park into the target parking space on a basis of the parameter.

19. A parking control method for controlling a vehicle on a basis of an operation command related to parking control acquired from outside of the vehicle, the parking control method, comprising:

evaluating, with a control device, around the vehicle, a level of a communication environment around the vehicle to transmit the operation command from an input terminal device that is related to the parking control to the vehicle, prior to receiving the operational command to execute the parking control, the input terminal device spaced a distance from the vehicle, wherein evaluating the level of the communication environment around the vehicle includes:

detecting an object having a distance around the vehicle and the input terminal device having a distance around the vehicle;

determining a distance between the input terminal device and the object based on the distance of the object around the vehicle and the distance of the input terminal device around the vehicle; and evaluating the level of the communication environment to be low as the distance between the object and the input terminal device that transmits the operation command is shorter or the distance between the vehicle and the object is shorter;

calculating, with the control device, a parameter that guides the vehicle into a target parking space in accordance with the level of the communication environment;

transmitting, from the input terminal device to the control device, the operation command to execute parking the vehicle after the parameter is calculated, and controlling, with the control device, the vehicle to park in a target parking space based on the parameter.

20. The parking control method according to claim 17, wherein evaluating the level of the communication environment on the basis of the disruption state of communication around the vehicle, includes:

setting an evaluation threshold for evaluating the disruption state of the communication signal when the level of the communication environment is evaluated to be low, wherein the evaluation threshold includes at least one occurrence of interference of the communication signal per unit of time, wherein the level of the communication environment is evaluated to be low when more than one occurrence of interference of the communication signal per unit of time occurs.

* * * * *